(12) United States Patent
Narasimhan et al.

(10) Patent No.: US 11,509,526 B2
(45) Date of Patent: Nov. 22, 2022

(54) DISTRIBUTED CLOUD AGENTS FOR MANAGING CLOUD SERVICES

(71) Applicant: SNOWFLAKE INC., San Mateo, CA (US)

(72) Inventors: Vineeth Narasimhan, Bangalore (IN); Joshua Lambert, Eagleville, PA (US); Thomas Herchek, Blue Bell, PA (US); Ryan Elliot Hope, King of Prussia, PA (US); Nitish Jha, Kharagpur (IN); Rahul Jain, Banglore (IN); Sumeet Singh, Bangalore (IN)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 16/988,995

(22) Filed: Aug. 10, 2020

(65) Prior Publication Data

US 2020/0374189 A1 Nov. 26, 2020

Related U.S. Application Data

(63) Continuation of application No. 16/809,354, filed on Mar. 4, 2020, which is a continuation of application
(Continued)

(51) Int. Cl.
*H04L 41/0806* (2022.01)
*H04W 4/50* (2018.01)
(Continued)

(52) U.S. Cl.
CPC ........ *H04L 41/0806* (2013.01); *H04L 41/046* (2013.01); *H04L 41/0816* (2013.01);
(Continued)

(58) Field of Classification Search
CPC .............. H04L 41/0806; H04L 41/046; H04L 41/0816; H04L 47/825; H04L 51/046;
(Continued)

(56) References Cited

U.S. PATENT DOCUMENTS 6,553,422 B1  4/2003 Nelsom
6,990,666 B2  1/2006 Hirschfeld et al.
(Continued)

FOREIGN PATENT DOCUMENTS

EP   1412846 A2    4/2004
WO   2012054222 A2 4/2012

OTHER PUBLICATIONS

International Search Report dated May 3, 2012 in corresponding International Patent Application No. PCT/US2012/020785.
(Continued)

*Primary Examiner* — Younes Naji
(74) *Attorney, Agent, or Firm* — Womble Bond Dickinson (US) LLP

(57) ABSTRACT

A first cloud extension agent that facilitates internet-based management of a first set of local computing resources of a network is provided by a remote network management platform. A first connection is established to the first cloud extension agent. A second cloud extension agent that facilitates internet-based management of a second set of local computing resources of a network is provided by the remote network management platform. A second connection is established to the second cloud extension agent. A first set of instructions is provided to the first cloud extension via the first connection and a second set of instructions is provided to the second cloud extension via the second connection.

27 Claims, 21 Drawing Sheets

Related U.S. Application Data

No. 15/785,137, filed on Oct. 16, 2017, now Pat. No. 10,623,245, which is a continuation of application No. 14/858,760, filed on Sep. 18, 2015, now Pat. No. 9,794,117, which is a continuation of application No. 13/347,352, filed on Jan. 10, 2012, now Pat. No. 9,172,766.

(60) Provisional application No. 61/431,270, filed on Jan. 10, 2011.

(51) Int. Cl.

| | | |
|---|---|---|
| *H04L 41/046* | (2022.01) | |
| *H04L 9/40* | (2022.01) | |
| *H04L 51/046* | (2022.01) | |
| *H04L 67/125* | (2022.01) | |
| *H04L 67/10* | (2022.01) | |
| *H04L 43/00* | (2022.01) | |
| *H04L 67/56* | (2022.01) | |
| *H04L 41/0816* | (2022.01) | |
| *H04L 67/02* | (2022.01) | |
| *H04L 67/1014* | (2022.01) | |
| *H04L 47/70* | (2022.01) | |
| *G06F 9/06* | (2006.01) | |
| *G06F 9/50* | (2006.01) | |
| *H04L 51/58* | (2022.01) | |

(52) U.S. Cl.
CPC .......... *H04L 43/00* (2013.01); *H04L 47/825* (2013.01); *H04L 51/046* (2013.01); *H04L 63/029* (2013.01); *H04L 67/02* (2013.01); *H04L 67/10* (2013.01); *H04L 67/1014* (2013.01); *H04L 67/125* (2013.01); *H04L 67/56* (2022.05); *H04W 4/50* (2018.02); *G06F 9/06* (2013.01); *G06F 9/5088* (2013.01); *H04L 51/58* (2022.05); *H04L 63/168* (2013.01); *H04L 63/20* (2013.01)

(58) Field of Classification Search
CPC ....... H04L 63/029; H04L 67/02; H04L 51/38; H04L 63/168; H04W 4/50; G06F 9/06
See application file for complete search history.

(56) References Cited

U.S. PATENT DOCUMENTS

| | | |
|---|---|---|
| 7,596,620 B1 | 9/2009 | Colton |
| 7,735,127 B1 | 6/2010 | Rive et al. |
| 8,341,625 B2 | 12/2012 | Ferris |
| 8,352,998 B1 | 1/2013 | Kougiouris |
| 8,499,330 B1 | 7/2013 | Albisu et al. |
| 8,572,602 B1 | 10/2013 | Colton |
| 9,167,275 B1 | 10/2015 | Daily |
| 9,203,775 B2 | 12/2015 | Mulligan |
| 9,264,350 B2 | 2/2016 | Saavedra |
| 9,760,412 B2* | 9/2017 | Knox .................. G06F 9/54 |
| 2002/0194495 A1* | 12/2002 | Gladstone ............ H04L 63/0254 726/22 |
| 2003/0126256 A1 | 7/2003 | Cruickshank |
| 2003/0177176 A1 | 9/2003 | Hirschfeld et al. |
| 2004/0028035 A1 | 2/2004 | Read |
| 2004/0044771 A1* | 3/2004 | Allred ................. H04L 41/0654 709/227 |
| 2004/0230787 A1 | 11/2004 | Blumenau |
| 2005/0038827 A1* | 2/2005 | Hooks ................. G06F 11/0793 |
| 2005/0193103 A1 | 9/2005 | Drabik |
| 2006/0085526 A1 | 4/2006 | Gulland |
| 2008/0016189 A1 | 1/2008 | Yoo |
| 2009/0070442 A1* | 3/2009 | Kacin .................. H04L 63/029 709/227 |
| 2009/0158189 A1 | 6/2009 | Itani |
| 2009/0187970 A1 | 7/2009 | Mower |
| 2009/0247125 A1 | 10/2009 | Grant |
| 2010/0022231 A1 | 1/2010 | Heins |
| 2010/0027552 A1 | 2/2010 | Hill |
| 2010/0057680 A1 | 3/2010 | Little |
| 2010/0088150 A1 | 4/2010 | Mazhar |
| 2010/0210240 A1 | 8/2010 | Mahaffey et al. |
| 2010/0217850 A1 | 8/2010 | Ferris |
| 2010/0254394 A1 | 10/2010 | Barta |
| 2010/0306354 A1 | 12/2010 | DeHaan |
| 2011/0072487 A1 | 3/2011 | Hadar |
| 2011/0078680 A1 | 3/2011 | Lagergren |
| 2011/0099273 A1* | 4/2011 | Ide ...................... G06F 11/3006 709/224 |
| 2011/0143811 A1 | 6/2011 | Rodriguez |
| 2011/0165896 A1 | 7/2011 | Stromberg |
| 2011/0185063 A1 | 7/2011 | Head |
| 2011/0231280 A1 | 9/2011 | Farah |
| 2011/0231477 A1* | 9/2011 | Safruti .................. G06F 9/5033 709/203 |
| 2011/0246596 A1 | 10/2011 | Cao |
| 2011/0274036 A1 | 11/2011 | Calhoun |
| 2011/0276986 A1 | 11/2011 | Kamath et al. |
| 2011/0289200 A1 | 11/2011 | Patil et al. |
| 2012/0005542 A1 | 1/2012 | Petersen |
| 2012/0011358 A1 | 1/2012 | Masone |
| 2012/0017042 A1 | 1/2012 | Matsui |
| 2012/0072627 A1* | 3/2012 | Droux .................... G06F 9/505 710/104 |
| 2012/0073482 A1 | 3/2012 | Meeker |
| 2012/0077464 A1 | 3/2012 | Nair et al. |
| 2012/0102494 A1 | 4/2012 | Cahill |
| 2012/0102506 A1 | 4/2012 | Hopmann |
| 2012/0131594 A1 | 5/2012 | Morgan |
| 2012/0151282 A1 | 6/2012 | Watanabe |
| 2012/0158200 A1* | 6/2012 | Vandevelde ...... H02J 13/00016 700/292 |
| 2012/0166576 A1 | 6/2012 | Orsini |
| 2012/0179817 A1 | 7/2012 | Bade |
| 2012/0185913 A1 | 7/2012 | Martinez |
| 2012/0271927 A1 | 10/2012 | Shakiryanova |
| 2012/0331523 A1 | 12/2012 | Cui |
| 2013/0054530 A1* | 2/2013 | Baker ................... G06F 16/119 707/639 |
| 2013/0173402 A1 | 7/2013 | Young |
| 2013/0318519 A1 | 11/2013 | Coolidge |
| 2013/0339949 A1 | 12/2013 | Spiers et al. |
| 2014/0118775 A1 | 5/2014 | Motamed |
| 2014/0379400 A1 | 12/2014 | Bailey |
| 2016/0112501 A1* | 4/2016 | Wheeler ............... H04L 67/104 709/204 |
| 2016/0143004 A1 | 5/2016 | Stromberg |
| 2016/0232549 A1 | 8/2016 | Guenette |
| 2016/0238272 A1 | 8/2016 | Imes |
| 2016/0300277 A1 | 10/2016 | Marlowe |
| 2016/0344745 A1 | 11/2016 | Johnson |

OTHER PUBLICATIONS

Supplementary European Search Report dated Jul. 4, 2016 in corresponding European Patent Application No. EP 12734136.
Jinghi Min, ABC: Dynamic Configuration Management for MicroBrick-based Cloud Computing Systems, Seoul National University.
Clement Quinton, Leveraging Feature Models to Configure Virtual Appliances.
Trieu C. Chieu: Dynamic Scaling of Web Applications in a Viritual-ized Cloud Computing Environment, IBM Research Center.

* cited by examiner

FIG. 3B

Maas360° Fiberlink Communications - Mozilla Firefox
File Edit View History Bookmarks Yahoo! Tools Help Http//staging20.fiberlink.com/xxxx/# ☆ ▼ ▶ Yahoo Maas360° | Delivering Mobility as a Service     xxxxx xxxxxxxx | My Profile | My Favorites | Logout Home | Manage | Reports | Filing | Support     Search xxxxx BlackBerry Jones BlackBerry>>

[BlackBerry Jones Backberry]     Back to Results

○ ○ Hardware ▸

○ Hardware

| Field | Value | Field | Value |
|---|---|---|---|
| Manufacturer | RIM | Model | #310 |
| PIN | 20745EDF | Activation Date | 1/31/2010, 10:15a.m |
| Operating System | BlackBerry OS 4.5.0.99 | Software Platform Varsion | S.1.0.112 |
| Total Memory (MB) | 6.4 | Free Memory (MB) | 9 |
| Screen Resolution | 320°240 | Screen Language | English (US) |
| Battery Level | 45% | | |

○ Device Identify

| Field | Value | Field | Value |
|---|---|---|---|
| Custom Asset Number | FI01921 | Device Owner | xxxx Davidxxx |
| Department | Sales | Vendor | Staples |
| Purchase Order # | xx2009-0091 | Purchase Type | Direct |
| Purchase Date | 1/31/2009 | Purchase Price | USD 1700 |
| Warranty Number | Yes | Warranty Type | 24x7 |
| Warranty xxxxxxx Date | 2/24/2011 | Office/Location | Blue Belt |
| Comments | xxxxxx | Custom Field | Custom Text |

| Maas360° | Sea Know xx | | | | xxxxxx xxxxxxxx | My Profile | Logout |
|---|---|---|---|---|---|---|---|
| Home | Manage | Reports | Feedback | | | Search xxxxx | |

Compliance Status Overview ▾

Compliance Status Overview

| | xxxxxx | ▸ | xxxxx | ▸ | xxx | xxxx | |

| Device Name ▾ | User Name | Active Set Name | Rule Set Name | Active Configured | Active Status | Time of Excution |
|---|---|---|---|---|---|---|
| xxxxxxxxxx | xxxxx | xxxxx Maas360 Environment | Blue Belt Set | Active User and Administrator | NA | XX/XX/XXXX 15:23 IST |
| xxxxxxxxxxx | xxx | xxxxx Maas360 Environment | Blue Belt Set | Active User and Administrator | NA | XX/XX/XXXX 16:23 IST |
| xxxxxxxxxx | xxxxxxxx | xxxxx Maas360 Environment | Blue Belt Set | Active User and Administrator | NA | XX/XX/XXXX 18:23 IST |
| xxxxxxxxxx | xxx | xxxxx Maas360 Environment | Blue Belt Set | Active User and Administrator | NA | XX/XX/XXXX 18:25 IST |
| xxxxxxxx | xxx | xxxxx Maas360 Environment | Blue Belt Set | Active User and Administrator | NA | XX/XX/XXXX 18:25 IST |
| xxxxxxxxxxx | xxxx | xxxxx Maas360 Environment | Blue Belt Set | Active User and Administrator | NA | XX/XX/XXXX 18:25 IST |
| xxxxxxxxxxxxx | xxxx | xxxxx Maas360 Environment | Blue Belt Set | Active User and Administrator | NA | XX/XX/XXXX 18:25 IST |
| xxxxxxxxxxx | xxxx | xxxxx Maas360 Environment | Blue Belt Set | Active User and Administrator | NA | XX/XX/XXXX 18:25 IST |
| xxxxxxxxxx | xxx | xxxxx Maas360 Environment | Blue Belt Set | Active User and Administrator | NA | XX/XX/XXXX 18:25 IST |
| xxxxxxxxxx | xxx | xxxxx Maas360 Environment | Blue Belt Set | Active User and Administrator | NA | XX/XX/XXXX 18:25 IST |
| xxxxxxxxx | xxx | xxxxx Maas360 Environment | Blue Belt Set | Active User and Administrator | NA | XX/XX/XXXX 15:23 IST |
| xxxxxxx | xxx | xxxxx Maas360 Environment | Blue Belt Set | Active User and Administrator | NA | XX/XX/XXXX XX:23 IST |
| xxxxxxxxxx | xxxxx | xxxxx Maas360 Environment | Blue Belt Set | Active User and Administrator | NA | XX/XX/XXXX 16:23 IST |
| xxxxxxxx | xxxxx | xxxxx Maas360 Environment | Blue Belt Set | Active User and Administrator | NA | XX/XX/XXXX 18:23 IST |

FIG. 3C

| Device MAILS | | | Configuration Status ☑Cloud Extend Online ☒ |
|---|---|---|---|
| ○ ☐ Summary ▾ ✎ Actions ▾ | | | ↻ Back to Results |
| Username | xxxxxx | Last Reported | 09/08/2011 07:42 IST |
| UserStatus | Active | Installed Date | 09/09/2011 06:28 IST |
| ⊙ Cloud Extender Configuration | | | |
| Cloud Extender Configuration | Yes | Last Configuration Modified Date | 10/11/2011 21:23 IST |
| Services Configured | xxxxx xxxxxx xxxxx Viability | Software Auto-Updates Enabled | Yes |
| Username for Service Account | Status | Domain of Service Account | xxxx |
| Powershell Version | 2.0 | | |
| ⊙ Proxy Settings | | | |
| Proxy Settings Configured | No | Proxy Server Address | - |
| Proxy Server Port | | Use Proxy Authentication | - |
| Username | | Domain | - |
| ⊙ Hardware Inventory | | | |
| Manufacturer | Yes | Model | xxx xxxx |
| Operating System | xxxxx xxxxx Server 2008.02 | Physical Memory Installed | 7.5 GB |
| Total Space on System Drive | 34.9@ | Free Space on System Drive | 10.63 GB |
| Agent Version | 2.30 840.065 | Service Package | xxxxx Cloud Extender |
| Timezone | (UIC) xxxx xxxxx xxxx xxx | | |
| Number of Active Modules | X | | |
| Module : Mobile Device Management | | | |
| Versions | 2,30,000 | Activation Date (Agent Local Time) | 08/09/2011 11:50 UTC |
| Module : xxxx Visibility | | | |

FIG. 6A

| Device MAILS | | | Configuration Status ☐ Cloud Extend Online ☒ |
|---|---|---|---|
| ⊙ ☐ Exchange Activetype ▾ ✎ Actions ▾ | | | ↻ Back to Results |
| [icon] | Username xxxxxx | Last Reported | 09/08/2011 07:42 IST |
| | UserStatus Active | Installed Date | 09/09/2011 16:18 IST |

⊙ Exchange ActiveSync Configuration

| Exchange Server Version | 2010 | Exchange Server Tool Version | 14.0.0.0 |
|---|---|---|---|
| Integrated Mailbox Servers | | Instance Used for Policy Management and Auto-Quarantine Settings | Yes |

⊙ Exchange ActiveSync Module Setup

| Last Communication Date to Exchange Server | 09/08/2011 07:42 IST | Last Incremental Data Upload Date | 09/08/2011 10:52 IST |
|---|---|---|---|
| Last Full Data Upload Date | 09/13/2011 07:20 IST | Last Policy Update Date | 09/01/2011 20:29 IST |
| Last Action Execution Date | | | |

⊙ Auto-Quarantine Settings

| Auto-Quarantine Enabled | Yes | Automatically Approve Existing Device | Yes |
|---|---|---|---|
| Emaill Address(xx) to be modified where a new device to quaratined | | | |

⊙ Exchange Server Summary xxxxx

| Mailboxes | 22 | Devices Synced | 18 |
|---|---|---|---|
| Exchange 2010 mailboxes | 32 | Mailboxes with More than 1 DeviceSynced | 7 |
| Exchange 2007 mailboxes | 0 | Devices with Last Reported Prior to Last 10 Days | 14 |
| Exchange 2003 mailboxes | 0 | | |

DISTRIBUTED CLOUD AGENTS FOR MANAGING CLOUD SERVICES

CROSS-REFERENCE TO RELATED APPLICATIONS

This application is a continuation of U.S. application Ser. No. 16/809,354 filed on Mar. 4, 2020, which a continuation of U.S. application Ser. No. 15/785,137, filed on Oct. 16, 2017, now U.S. Pat. No. 10,623,245, issued on Apr. 14, 2020, which is a continuation of U.S. application Ser. No. 14/858,760, filed on Sep. 18, 2015, now U.S. Pat. No. 9,794,117, issued on Oct. 17, 2017, which is a continuation of U.S. application Ser. No. 13/347,352, filed on Jan. 10, 2012, now U.S. Pat. No. 9,172,766, issued on Oct. 27, 2015, which claims priority to U.S. Provisional Application Ser. No. 61/431,270, filed on Jan. 10, 2011, entitled "System and Method for Extending Cloud Services Into the Customer Premise," each of which is incorporated herein by reference in its entirety.

TECHNICAL FIELD

The present invention relates generally to methods and systems for providing cloud-based computing services and more specifically providing cloud-based management of on premise corporate resources, such as email or directory servers.

BACKGROUND

The general trend in corporate network management is the addition of mobility of users of the corporate network. Whereas traditional corporate networks have included a LAN and local desktop devices, the recent trend has been the introduction of mobile devices, such as smart phones, that are used by employees to work remotely. While allowing users to work remotely is desirable within an organization, from an IT perspective the mobility of users can present certain challenges.

A common challenge in organizations that allow mobile access to users is the need for reliable security solutions. For example, users within an organization may use several different platforms for accessing resources within a network. Users may use smart phones, such as Blackberries, iPhones, and Android devices, tablet computing devices, such as iPads or similar offerings with other mobile operating systems, laptops, or home desktops. The diversity of devices and operating systems employed by these devices can make it difficult to ensure security when users access computing resources within an organization's network.

A common solution requires creating security policies for a given mobile platform. For example, an organization may require that all iPad users use a strong password to protect their devices. The policy may also include the requirement that certain applications (e.g. blacklist applications) not operate on the device when a user is accessing computing resources within an organization. The policy may also include the requirement that certain applications, such as an application that allows a remote wipe of the device, be installed and running at the time of network access.

The rapid evolution of threats and the rapid changes in mobile devices accessing an organization's resources can make maintaining policies to keep up with threats difficult for IT administrators. As a result, organizations often maintain mobility management applications or other security software that ensures compliance of devices with security policies. These applications traditionally operate on local servers, allowing management applications to interface with local resources, such as Exchange servers and BlackBerry Enterprise servers (BES). However, the need to maintain these applications locally requires an organization to maintain dedicated hardware for the applications, and can make it difficult for an organization to keep up with changes to the applications, maintain current versions, and scale applications to meet growth in an organization. Accordingly, maintaining these applications can be a burden to IT resources.

A common trend in general software includes moving software outside of organizations to provide the software as a service. This so-called cloud-based approach has certain inherent advantages. For example, as an organization grows or the software updates, the user of the software need not be burdened with these updates and can easily scale the software to meet his needs. A cloud-based solution also provides certain billing options that may not be easily available with traditional on-premises managed applications. Whereas a traditional software licensing model may include selling software on a per-seat, unlimited-use basis, cloud-based software allows more flexibility, including the ability to bill customers for monthly use, actual use, etc. Cloud-based software can also be less intrusive or make it easier to outsource management and maintenance of the software. Cloud-based software can automatically give users access to updates as they become available, rather than requiring a user to pay a maintenance fee, or require a user to upgrade software each time an upgrade becomes available.

While cloud-based software has inherent advantages for certain types of software, a cloud-based approach does not necessarily work well for other types of software. For example, network management and mobile device management software can be difficult to offer as a cloud-based solution. Whereas traditional network management software can allow users to deploy policies that include changing the configuration of local resources, such as Exchange servers, BES, or user directories, the traditional security approach to corporate networks makes allowing these types of changes difficult to implement via the Internet. For obvious reasons, an organization does not typically allow changes to the configuration of security policies on sensitive resources, such as Exchange servers, via Internet connections. Instead, these types of changes are typically explicitly excluded via firewall policies. These firewalls, therefore, make it difficult to move security applications, such as network management and mobile device management applications, from a traditional locally maintained software approach to a cloud-based approach. There is therefore a need to enable applications that configure local resources to be moved to the cloud without sacrificing traditional firewall security.

SUMMARY

Applicants have recognized and appreciated that certain problems with the prior art can be solved by providing a cloud extension agent on a customer premise for interfacing, via an outbound secure connection, cloud based services. The cloud extension agent can reach the cloud based services through existing firewall infrastructure, often without requiring changes to the existing firewall security policies, thereby providing simple, secure deployment. Furthermore, the secure connection can enable substantially real-time communication with a cloud service to provide web-based, substantially real time control of resources on the customer premises via the cloud extension agent.

One embodiment is directed to a method for providing network management services, including providing a cloud extension agent for execution on hardware that is part of a first local network, which is separated from the Internet by at least one firewall. The cloud extension agent is configured to initiate a first connection to at least one external server over the Internet using a standard internet protocol and receive, via the first connection, a first set of instructions for management of a first set of mobile devices that are managed by one or more local servers on the first local network. The cloud extension agent is further configured to make changes to the configuration of the one or more local servers in response to the first set of instructions.

Another embodiment is directed to a method for extending cloud services into the customer premise including providing a cloud extension agent for execution on hardware that is part of a first local network which is separated from the Internet by at least one firewall. The cloud extension agent is configured to initiate a first connection to a remote data-center over the Internet, through the at least one firewall, using a standard internet protocol and receive, via the first connection, a first set of instructions for configuration of one or more local resources on the first local network. The cloud extension agent is further configured to make changes to the configuration of the one or more local resources in response to the first set of instructions.

One aspect of some embodiments of the present invention further includes providing a web-based portal that allows a user to configure the first set of mobile devices or other resources, and in response to configuration changes initiated via the web-based portal, creating the first set of instructions to be sent to the agent via the first connection. Another aspect of some embodiments of the present invention further includes sending the first set of instructions to the cloud extension agent in substantially real time. Another aspect of some embodiments of the present invention further includes sending the instructions using an XMPP protocol over the first connection. In some embodiments of the present invention, the cloud extension agent is further configured to collect status information pertaining to the first set of devices or resources and report the status information to at least one cloud-based service.

Another aspect of some embodiments of the present invention includes providing a web-based portal that allows a user to manage the first set of mobile devices or resources via the Internet. Still another aspect of some embodiments of the present invention includes providing a web-based portal that allows a user to remotely diagnose problems with one of the cloud extension agent and the one or more local servers, via the Internet. Yet another aspect of some embodiments of the present invention includes providing a web-based portal that allows a user to remotely upgrade the cloud extension agent via the Internet. Still another aspect of some embodiments of the present invention includes providing a web-based portal that allows a user to publish network policies to the cloud extension agent via the Internet.

One embodiment is directed to a method for providing cloud-based management of mobile devices, including providing, at one or more remote data centers, a web-based interface for management of policies for a first set of mobile devices that are associated with a first corporate network and maintaining, in a first database associated with the one or more remote data centers, policy and configuration information related to the first set of mobile devices. The method further includes receiving, over the Internet, a first secure connection initiated by a first cloud extension agent using a standard internet protocol, and in response to policy changes initiated through the web-based interface, sending control instructions over the first secure connection to the first cloud extension agent. The cloud extension agent is configurable to configure resources on the corporate network based on the control instructions.

One aspect of some embodiments of the present invention includes receiving status information from the cloud extension agent reflecting the status of one or more mobile devices in the first set of mobile devices and selectively presenting the status information to an administrator using web-based interface. Another aspect of some embodiments of the present invention includes receiving, over the first secure connection, status information pertaining to the first set of mobile devices from the cloud extension agent. Yet another aspect of some embodiments of the present invention includes receiving, over the Internet, a first secure connection initiated by a second cloud extension agent using the standard internet protocol, wherein the second cloud extension agent is available in the event of failure of the first cloud extension agent.

It should be appreciated that all combinations of the foregoing concepts and additional concepts discussed in greater detail below (provided that such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A and 3B are exemplary screenshots of device views that can be displayed by the device view manager via a web portal for use with certain embodiments of the present invention;

FIG. 3C is a screenshot of alerts that can be displayed by the alert manager via a web portal for use with certain embodiments of the present invention;

FIG. 6A are screenshots of exemplary cloud extension agent configuration views that can be displayed via a web portal for use with certain embodiments of the present invention;

FIG. 6B is a screenshot of exemplary cloud extension agent configuration views that can be displayed via a web portal for use with certain embodiments of the present invention;

FIG. 8B is a screenshot of an exemplary cloud extension agent configuration and settings view that can be displayed via a web portal for use with certain embodiments of the present invention;

DETAILED DESCRIPTION OF EXEMPLARY EMBODIMENTS

Figure 1A:
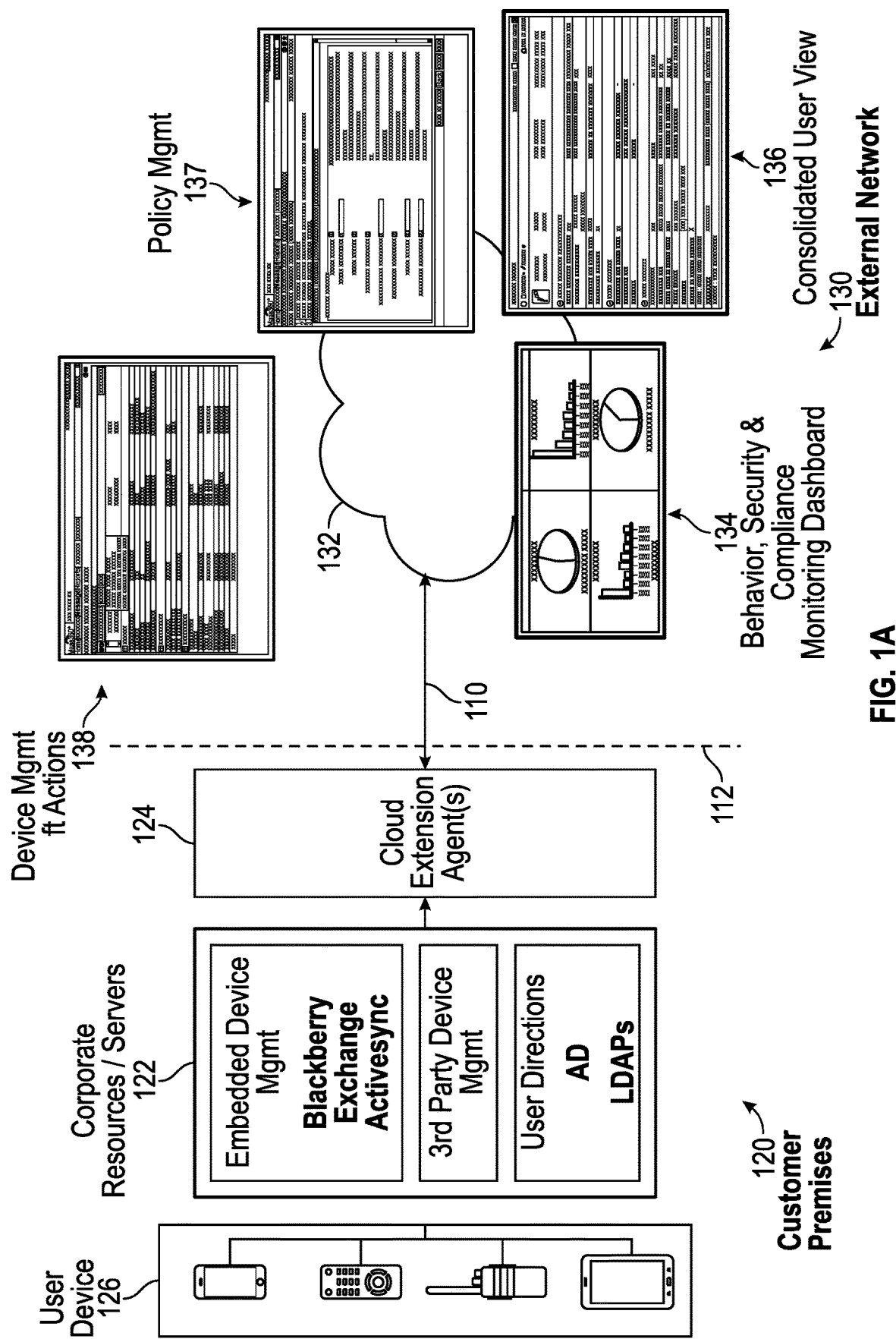
FIGS. 1A and 1B are system diagrams of a cloud-based management system suitable for use with certain embodiments of the present invention.

The present invention solves many issues of moving network management to a cloud by placing a lightweight cloud extension agent on a corporate network and using the cloud extension agent to connect to a cloud-based network management platform through any firewalls using standard secure Internet protocols, such as HTTPS. By utilizing an Internet protocol that is allowed by default by most firewalls (e.g. HTTP/HTTPS via ports 80/443), the cloud extension agent can communicate with the network management platform on the cloud without requiring that an administrator reconfigure a local firewall to allow cloud-based network management. The cloud extension agent can then use instructions received over the connection to configure local resources and servers directly from within a corporate network. In this manner, the firewall may be unaware that network management is taking place from outside the corporate network. In addition, the firewall can remain in place without needing to be reconfigured or security policies needing to be changed. A firewall can maintain strong security against intrusion, while allowing the cloud extension agent to still interface with the network management platform outside the corporate network.

As used herein, a corporate network should be considered a term for any network used by an organization that includes resources, such as Exchange servers, that need to be configured behind a firewall. Generally, a corporate network will include at least one local area network that is local to the organization. This can include campus networks used by universities or other institutions or networks used by corporations or small businesses. The corporate network may be large or small, and some networks may be maintained by a local IT staff. A corporate network can further be composed of multiple networks that interact with shared corporate computing resources, such as BlackBerry Enterprise servers (BES). A typical corporate network has a need for security policies, including firewall policies and mobile device management policies for users of the network that access network resources remotely (e.g. from outside the network), but it will be understood that these individual features are not required of a corporate network and the term should be construed broadly. In some embodiments corporate networks are synonymous with customer premises. It should also be understood that references to corporate, corporations, organizations, etc. may be interchangeable and are not intended to be limited to commercial business organizations. While many of the embodiments described herein are described with reference to corporate environments, these embodiments are merely illustrative and can also apply to the computing environment of any organization that has a need for remote management of network resources via a cloud-based approach.

As used herein, a cloud extension agent is a software agent running on resources within a corporate network for purposes of extending control of local resources to one or more datacenters on the Internet. A cloud extension agent can be configured to initiate an outbound secure connection through one or more firewalls to interface with resources across the Internet (e.g., open a connection to cloud-based resources via HTTPS). Cloud extension agents may be further configured to interface with servers or other resources within the corporate network through APIs, exposed network ports, or other software protocols. This allows the cloud extension agent to change the configuration of these resources. Some cloud extension agents may further be configured to monitor status of these resources, such as by accessing user profiles, policies, or device status information for mobile devices associated with users that utilize these resources. For example, a cloud extension agent may be capable of reviewing the security status of one or more mobile devices used by users of the network. For example, Exchange server and BES servers can monitor and report devices configuration and status information to the cloud extension agent. In some embodiments, a cloud extension agent may be further configured to upload a snapshot of information to the cloud-based network management platform about resources on the corporate network and/or mobile devices authorized to connect to the network.

Some embodiments of a cloud extension agent are suitable for interfacing with corporate servers for maintaining security policies related to mobile devices. Mobile devices, as used herein, can include smart phones (e.g. Blackberries, iPhones, Android phones), tablets (e.g. iOS, Android, Blackberry OS, or Windows tablets), laptops, mobile computing devices, PDAs, or any other device suitable for remote access to corporate resources. Some embodiments are particularly suitable for mobile devices having a mobile operating system (e.g. iOS, Android, Blackberry OS, or Windows Phone 7). In some embodiments, a cloud extension agent can also be used to configure security policies for any remote access to corporate resources, including accessing corporate resources from other networks, including access from home networks via a user's home computer or from another corporate network. In this manner, some devices, such as home desktop PCs or Macs can also be considered mobile devices when allowing mobility of user connections. In some embodiments, a cloud extension agent is also suitable for configuring corporate resources for other purposes that will be apparent to one of ordinary skill in the art.

It will be appreciated that a cloud extension agent may be used to configure any corporate resources via interaction with cloud-based resources through a firewall, where the configuration of corporate resources would typically be frustrated or impossible by remote access through the firewall. In this manner, a cloud extension agent effectively extends management of corporate resources from the local network to the cloud, where such an extension might not otherwise be feasible.

FIG. 1A shows an exemplary computing environment for use of the present invention. One or more cloud extension agents 124 allow communication between external network 130 and customer premises 120. Customer premises 120 can be, for example, a corporate network. External network 130 can be, for example, the Internet, including any remote data centers that provide cloud-based services. Within the customer premises 120, local corporate resources and servers 122 (e.g. servers or other configurable resources, which will be collectively referred to as corporate servers) provide resource access to user devices 126. User devices 126 can include computing devices such as mobile devices or computers. These devices can include, for example, smart phones, tablets, laptops, or any other device that a user may use to remotely access corporate servers 122. Corporate servers 122 can include management services for providing access and access control for user devices 126. For example, a corporate server may include embedded device management for BES and Exchange ActiveSync communication to allow user devices 126 to access corporate e-mail and data. These servers 122 can also include third-party device management, such as Microsoft System Center. This can further include third-party access services and device management applications. Corporate servers 122 can also include user directories such as Active Directory in a Microsoft environment. This can include authentication servers and user profiles. This can also include any number of lightweight directory access protocol servers.

Cloud extension agent 124 opens a connection 110 to one or more external servers in cloud 132 through firewall 112. Many firewalls restrict inbound connections. However, by employing a cloud extension agent 124, connection 110 can be initiated as an outbound connection through firewall 112. This allows connection 110 to be made through firewall 112, without the need for extensive changes to the policies of firewall 112. Utilizing an outbound connection has several advantages, including easy administration of cloud extension agent 124 and firewall 112, without the need for specialized training or complex configurations. In some embodiments, connection 110 is initiated as an outbound HTTPS connection. Most firewalls 112 allow HTTP and HTTPS connections in an outbound manner without additional configuration by an administrator. For example, many firewalls enable TCP ports 80 and 443 by default. Once initiated, connection 110 can allow real-time bidirectional communication between one or more data centers on cloud 132 and cloud extension agent 124, and can facilitate higher OSI layer communication protocols. In this way, connection 110 is initiated as an outgoing connection through firewall 112, but allows control instructions to be passed from external network management platforms to cloud extension agent 124.

As explained herein, cloud extension agent 124 can include a plurality of cloud extension agents. This can enable load balancing, load sharing, redundancy, failover, or allow for greater scalability. Cloud extension agent 124, therefore, should be understood to include both embodiments where a single cloud extension agent is used in embodiments where a plurality of cloud extension agents is used.

One or more data centers within cloud 132 can provide web-based interfaces for control, management, and viewing of status and configuration information. In this manner, some embodiments of the present invention provide a web-based management platform where interaction via a web interface, and the remote data center can configure and monitor corporate resources and servers via cloud extension agents 124. One example of a management platform suitable for implementation on cloud 132 is the MaaS360® suite of network and mobile device management applications from Fiberlink Communications Inc. Examples of the web-based interfaces that can be provided by data centers and cloud 132 are explained throughout. These interfaces can include, for example, behavior, security and compliance monitoring dashboard 134, consolidated user view 136, policy management interface 137, and device management and actions interface 138.

Dashboard 134 can provide visibility information about users and user devices 126 to an administrator via a web interface. This information can include information about compliance with policies, status information, configuration information, or other information about user devices 126. This can be displayed via a webpage that can include display of the information in a dashboard fashion, which can include hierarchal representations of information, including at-a-glance statistical information about users and devices 126 as a whole, or information about a specific user/device or group of devices within the plurality of user devices 126. Information about these individual devices or groups of devices may be obtained by clicking on larger statistical representations of status information of the larger group of user devices 126.

Consolidated user view 136 can also include dashboard information via a webpage for displaying information about users of user devices 126. Such information can include behavioral information about individual users, such as the last time he logged in, whether his devices are in compliance, or which devices are associated with each user. It should be appreciated that any number of web interfaces 134, 136, 137, or 138 can be displayed as links or tabs from a common page in a user of a web-based interface can easily move between these various views.

Policy Management interface 137 can allow administrators to access information about currently deployed policies on corporate servers 122. Policy Management interface 137 can also be used to facilitate the creation of new policies or changes to existing policies. Policy Management interface 137 can therefore be used by an administrator to manage security policies relating to user devices 126 and corporate servers 122 via a web interface. This can allow rapid changes to policies within customer premises 120 via the web.

Device management and actions interface 138 can be used to view status information about individual devices and manage individual devices, such as allowing an administrator to remotely wipe a given device. For example, if a user device were to be lost, and administrator could use device management and actions interface 138 to initiate a remote wipe of sensitive data from the device. This interface can also be used to facilitate updates to a device or changes to security settings on the device, if available via the devices operating system.

Figure 1B:
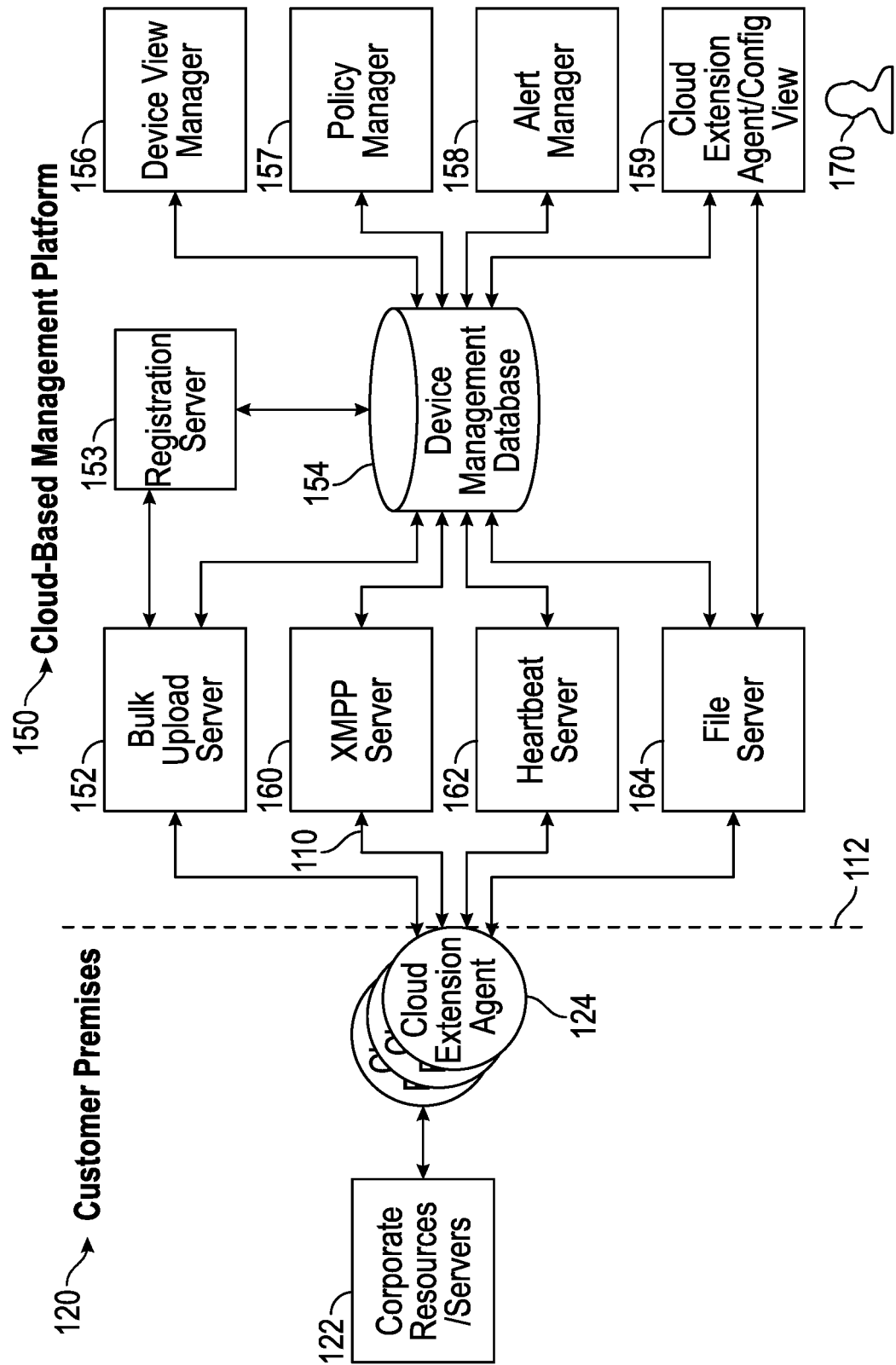

FIG. 1B shows a system diagram that includes more detail on individual components that may be available within a remote data center that hosts the cloud-based management platform 150. Cloud-based management platform 150 can be a platform that provides one or more cloud based services, such as a network management service. Accordingly, cloud-based management platform 150 can be referred to as one or more cloud based services. In some embodiments, the cloud-based management platform 150 has visibility and control components and is built on a modular design. The cloud extension agent can be a proxy aware component that is suitable for integrating with alterable third-party management solutions, including Exchange ActiveSync and BES. Cloud-based management platform 150 works with cloud extension agent 124 via connection 110 to provide remote administration services on customer premises 120.

In some embodiments, the cloud-based management platform provides the following advantages. Working with cloud extension agent 124, the cloud-based management platform can extract device and user attributes and upload these for display via a web interface or for use in segmenting the device or user population for administration purposes. This can include various hardware inventory, network, security and compliance and software inventory information about the devices 126. This can include transactional views that can be used to analyze and report this information. Furthermore, by working with cloud extension agent 124 real-time actions can be executed by cloud-based management platform 150 to interact with user devices 126, such as lock, wipe, locate, or change password. Additionally, cloud-based management platform 150 can be used to provide global settings and policy definitions, as well as management and assignments such as maintaining pass code policies on all mobile devices associated with customer premises 120. This can allow an organization to manage the mobile devices connecting to its network while outsourcing the management to a cloud-based vendor.

Cloud extension agent 124 can communicate with several front-end servers in one or more remote data centers. Bulk upload server 152 can be used by cloud extension agent 124 to upload information about device configuration or configuration and status information of corporate servers 122 and user devices 126. At initialization, the amount of information that may be loaded onto bulk upload server 152 can be relatively large. In some embodiments, bulk upload server 152 is a standalone server in a data center. In some embodiments, it can be a software component operating on the same server hardware as the other servers in the data center that supports cloud-based management platform 150. Bulk upload server 152 can work with registration server 153 to create records for newly registered individual devices or corporate servers, upon receiving status information from cloud extension agent 124. Bulk upload server 152 and registration server 153 can interface with device management database 154 to create and maintain records for individual user devices or corporate servers. For example, for new devices with no records in device management database 154, registration server 153 will create a new record. For devices having an existing record in device database 154, bulk upload server 152 can update the record in the database.

XMPP server 160 provides messaging services between cloud extension agent 124 and device management database 154. XMPP is a standard protocol for real-time messaging (instant messaging) utilizing an XML framework. XMPP can be used to communicate over an HTTP or HTTPS connection. XMPP server 160 can be used to send control messages to cloud extension agent 124, using an instant messaging approach. By utilizing XMPP over a connection 110, such as an HTTPS connection or a bidirectional communication over synchronous HTTPS connections (e.g. XMPP over BOSH), control messages can be sent from cloud-based management platform 154 to cloud extension agent 124. Cloud extension agent 124 can then execute these control messages and perform actions, such as changing configuration of corporate servers 122. In this manner, actions (such as changing policies of these corporate resources and servers) can be carried out using a simple outbound-initiated HTTPS connection through firewall 112. Control messages in XMPP format can have an extensible format that allows any type of control message that may be suitable for an application.

Furthermore, because the communication of control messages is via an instant messaging protocol over a secure HTTP connection, control can be done in a secure manner and in substantially real-time. For example, the available instructions can be limited to simple instructions related to device management policies that must be handled by cloud extension agent 124. Because an implementer of cloud-based management platform 150 and cloud extension agent 124 has control of the library of available command messages sent over the XMPP channel, control can be implemented without exposing corporate servers 122 to malicious attack. For example, firewall 112 can still maintain all security that any standard firewall would maintain, and corporate servers 122 can operate without exposing APIs or ports to the Internet. Thus, while the configuration of policies relating to corporate servers 122 can be controlled by cloud-based management platform 150 via XMPP server 160, this control can be limited so as not to expose sensitive corporate resources to a security attack. Furthermore, because XMPP server 160 only communicates with cloud extension agent 124 via a secure channel initiated by cloud extension agent 124, it would be difficult for an attacker to take advantage of the communication. Because cloud extension agent 124, initiates the connection, cloud extension agent 124 can be configured to only connect with a trusted XMPP server 160 assisted with a trusted cloud-based management platform 150. A vendor that maintains both cloud-based management platform 150 and cloud extension agent 124 can therefore make it very difficult for an attacker to spoof XMPP server 160. Similarly, the scope of available commands can be limited to those related to the management task being performed, preventing any malicious use of the command received from cloud extender 124 from causing damage to corporate servers 122. In this manner, a secure end-to-end connection between device management database 154 and configuration and status information of corporate servers 122 can be maintained. This allows management of corporate servers 122 to be essentially extended to the cloud and cloud-based management platform 150.

Furthermore, because the XMPP protocol (or any similar bidirectional messaging protocol) provides an efficient means for communicating messages and is used in embodiments of the present invention for control, actions can be effectuated in substantially real-time. For example, once an outgoing connection is initiated by the cloud extension agent, it creates a secure, persistent messaging channel for messages from the XMPP server. In some embodiments, actions initiated by an administrator via a web interface for the cloud-based management platform can be effected nearly instantaneously by sending messages to the cloud extension agent via the XMPP server.

Furthermore, by using a secure connection through firewall, using a standard Internet protocol and an instant messaging control protocol to exchange control messages between the cloud-based management platform 150 and the cloud extension agent 124, the system can have advantages over prior art configurations. For example, in prior art configurations that use a demilitarized zone (DMZ), software can be placed in a DMZ for communication outside a network without having to go through a firewall. However, because the DMZ does not interface external networks through a firewall, the DMZ itself must be generally be quarantined from the rest of corporate network. Therefore, if an agent was placed in a DMZ there would most likely be a firewall between the agent and the corporate servers that the agent seeks to configure. In such a configuration, it would be difficult for an agent to communicate configuration information to the servers, because the corporate servers would not expose the ports necessary for configuration to software in the DMZ. In contrast, in some embodiments of the present invention, the cloud extension agent is on the same network as the corporate resources being configured. Furthermore, there is generally no firewall (or at least no full-security firewall) between the cloud extension agent and the corporate servers. Accordingly, corporate servers 122 can expose APIs and communication ports to the cloud extension agent 124 that might not otherwise be available in the prior art configurations.

In some embodiments, the difference between bulk upload server 152 and XMPP server 160 can be described as visibility versus control. Cloud extension agent 124 connects to bulk upload server 152 to provide visibility information about mobile devices connected to corporate servers 122. On the other hand, XMPP server 160 provides control to cloud extension agent 124 so that cloud extension agent 124 can receive commands for management of corporate servers 122.

In some embodiments, heartbeat server 162 can also be used to allow further communication between cloud extension agent 124, and device management database 154. Heartbeat server 162 can be used to manage cloud extension agent 124 itself. For example, if an update is required to the configuration information of the cloud extension agent or a new software update is available, this information can be conveyed via heartbeat server 162. XMPP server 160, on the other hand, generally provides real-time communication of commands for cloud extension agent to execute during normal operation. Heartbeat server 162 can be used for administrative tasks that do not require real-time implementation. A heartbeat server is generally a server that is configured to exchange data with a cloud extension agent at a regular interval. In some embodiments, the mechanism used is polling by the cloud extension agent at a predetermined interval. The heartbeat server can be further configured to determine that a cloud extension agent has failed to check in within a predetermined threshold time, indication an error with the cloud extension agent. In some embodiments, cloud extension agent 124 polls heartbeat server 162 every 6 minutes, while some embodiments utilize a shorter or longer heartbeat interval. This allows cloud extension agent 124 to be updated and managed separately from the execution of commands to control corporate resources, 122, without burdening network bandwidth. It should be appreciated that any polling interval can be chosen as appropriate In some instances, cloud extension agent 124 can also communicate with file server 164 to download updates to cloud extension agent software, etc. This can prevent large data transfer from burdening heartbeat server 162. In some embodiments, bulk upload server 152, XMPP server 160, heartbeat server 162, file server 164 can be separate servers or parts of the same hardware or software server.

Device management database 154 provides a central repository for control information and visibility information used by cloud-based management platform 150. This information can include device configuration and status information, such as information received by bulk upload server 152. This information can also include information related to commands that are sent to cloud extension agent 124 via XMPP server 160 or information about updates to be sent to cloud extension agent 124 via heartbeat server 162. It may also include information used for accessing appropriate files to upload or download via file server 164. It will be appreciated that any appropriate database may be used including a single database or separate databases for separate purposes or direct mailbox/buffer communication between the front-end servers 152, 160, 162, and 164, and the various user interfaces. It should be appreciated that device management database 154 is not be limited to a database and other appropriate computing structures can be used in different embodiments.

Cloud-based management platform 150 also includes various user interfaces and managers that can be used by a user 172 interact with visibility or control of user devices. Device view manager 156 can be used to access and organize device information stored in the device management database 154. An example of the type of interface that may be provided by device view manager 156 is shown in interface 138.

Policy manager 157 may be provided to allow a user to easily manage, create, organize, and edit policies that will be deployed on customer premises 120. These can include any type of device management policies that are appropriate for the application, including security policies that will be used by enterprise servers for ensuring secure access by user devices 126.

Alert manager 158 may be provided to allow an administrator to utilize filters to monitor conditions in the customer premises 120. For example, e-mail or SMS alerts may be provided by alert manager 158 when certain devices fall below a compliance threshold. This can be used by administrators to determine on a real-time basis which devices need immediate updates or to quickly learn when the overall health of compliance exceeds a minimum threshold level. Cloud extension agent configuration view 159 can be provided to the administrator to allow the administrator to configure individual cloud extension agents so that they perform as the administrator chooses. For example, this can enable an administrator to configure a cloud extension agent to communicate with an Exchange server. This can also include creating new cloud extension agents on customer premises 120.

Figure 2:
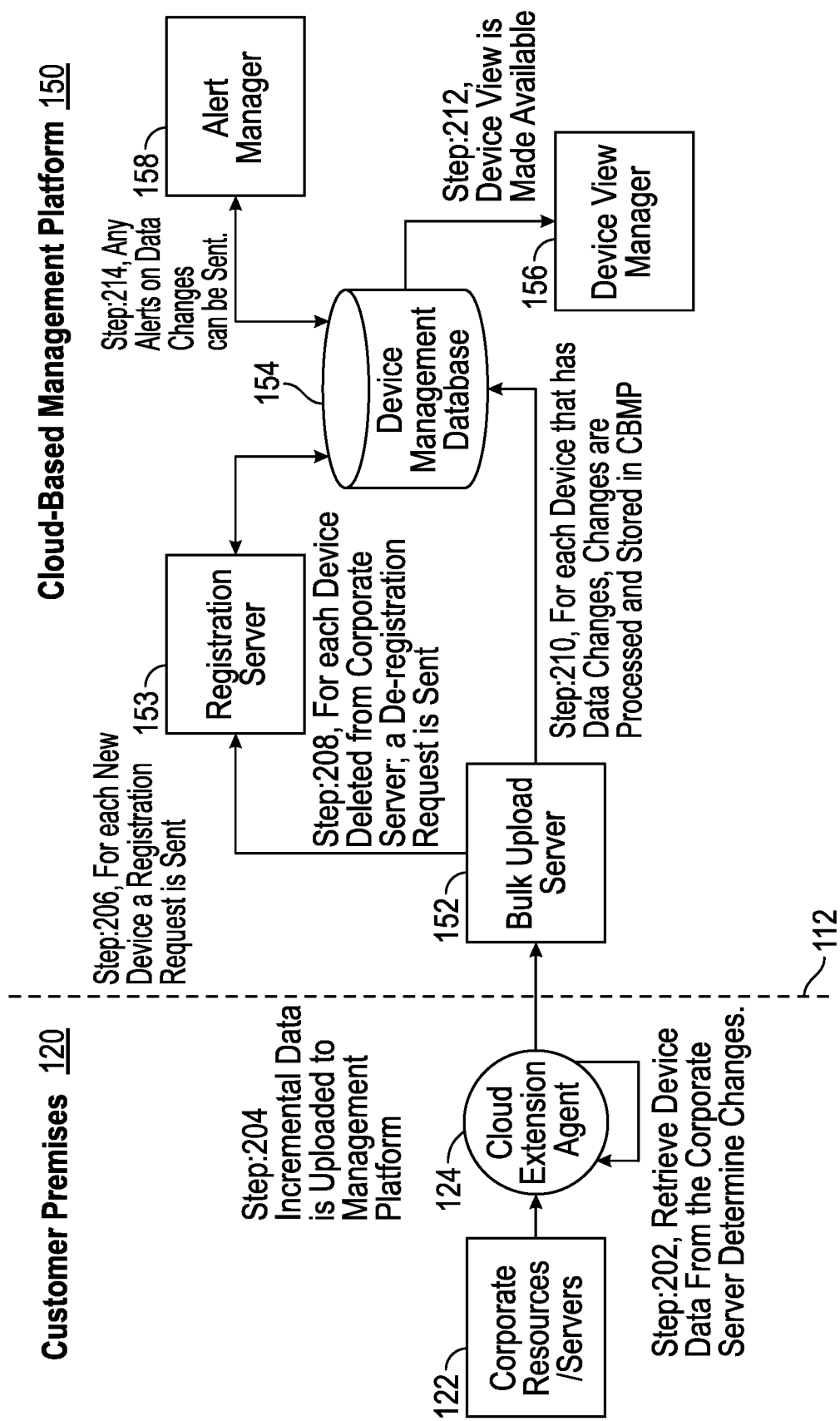
FIG. 2 is a flow chart and system diagram depicting a data upload operation for use with certain embodiments of the present invention.

FIG. 2 shows a data upload operation. At step 202 cloud extension agent 124. Retrieved device data from the corporate servers and determines if any device configuration or status information has changed. At step 204 cloud extension agent 124 reports status information about the user devices or other network components to the cloud-based management platform 150. This can be in the form of HTTPS communication. Device status and configuration information included can be in an XML, format or any other appropriate format. When the cloud extension agent first starts up, the device status information uploaded about devices 126 can be quite large and can be a snapshot of the entire status of all user devices 126. During subsequent operation after the cloud extension agent has been initialized only incremental data about changes to user devices 126, will be uploaded in some embodiments.

In some embodiments, a scheme format is used to allow universal formatting of bulk upload data related to mobile devices. Examples of formats for use with data uploads and for instructions sent to cloud extension agents are provided at the end of this specification.

At step 206, bulk upload server 152 determines if any new devices are included in the data received from cloud extension agent 124. For new devices, bulk upload server 152 can indicates with registration server 153 to initiate a new registration of a user device with the device management database 154.

At step 208 registration server 153 works with device management database 154 to create new records for new devices that do not have existing records, and for any devices that have been deleted based on information received from corporate servers 122, registration server 153 will delete the record for those devices from device manager database 154.

At step 210 each device that has updated information will have this information updated in device management database 154. Any incremental data received by bulk upload server 152 can be sent to device management database 154 to update the records for a corresponding device. In this manner, device management database 154 maintains complete and accurate up-to-date records of status and configuration information of user devices 126. This information can be used by various user interface managers to present the status information to an administrative user.

For example, device view manager 156 can access device management database 154 to review status and configuration information for a subset of devices 126, or individual devices. At step 212 device view manager 156 accesses device management database 154 to review information about the current status of devices 126. This can be either a push or pull operation. Device view manager 156 can initiate queries of device management database 154 in response to selection via a web interface by an administrator 170. Alternatively, device view manager 156 can regularly access device management database 154 to maintain a display of user device information.

In some embodiments, the device views presented via device manager 156 through a web portal can be configurable based on user preferences. Furthermore, the device used can be configurable based on the source of information for each device. For example, where the source of device information is an ActiveSync server, the device view can have a certain format, while BES server information can have a different format for display to user. Furthermore, depending on the type of device and source of information, the available information about a device, including the attribute types, can change. Accordingly, device view manager 156 can take into account the source of the device data when choosing how to present the device information to an administrator.

Similarly, alert manager 158 can access device management database 154 to determine if alerts are necessary to display to an administrator based on certain status information of user devices 126. At step 214 alert manager 158 receives information from device management database 154 related to alerts. Again, this can be either a push or pull operation depending on the implementation of the manager. For example, alert manager 158 can query, based on alert filters, to determine if certain conditions necessary to trigger an alert exist in the database. Similarly, alert manager 158 can register with device management database 154 to regularly receive certain types of information related to alerts. If the alert condition exists, alert manager 158 can display an alert via the screen of a web interface to an administrator, via a text message, or via an e-mail message.

In some embodiments, the upload of information can include using the cloud extension agent to upload user and device information for a defined subset of user devices. This can allow user groups to be formed and maintained separately from other devices and users. Similarly, in some embodiments, the upload can be directed based on substantially real-time actions received by the cloud extension agent from the XMPP server. In this manner, visibility and control can be connected. Actions can be sent to the cloud extension agent in substantially real time, can be initiated via a web interface, and can cause the cloud extension agent to upload visibility information pertaining to users or to user devices, or any dynamically assignable subset thereof, can be gathered and uploaded to the bulk upload server. Similarly, other types of actions can be initiated via the substantially real-time messaging through the XMPP server, as described throughout.

Figure 3A:
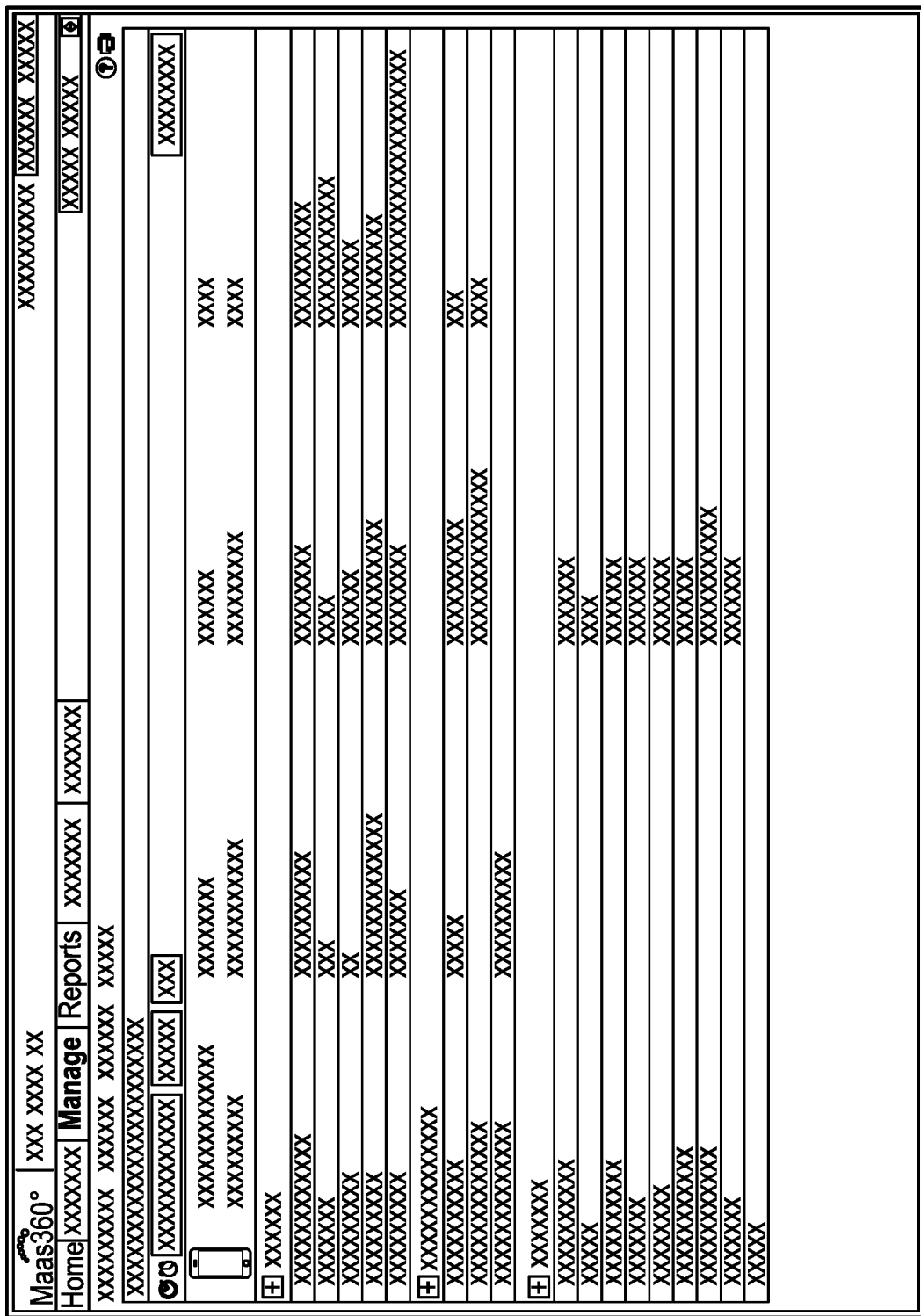

FIGS. 3A and 3B show exemplary screenshots of device views that can be displayed by the device view manager 156 to administrative user via a web interface. FIG. 3A shows an exemplary display of information related to an exchange ActiveSync device. In this example, the device is an Apple iOS device (e.g., an iPhone), which last reported on Dec. 22, 2010, and has an active license assigned to user "akuhn." As can be seen the user's e-mail address the model of the phone the ActiveSync device ID the ActiveSync identity of the user and his device, as well as security and compliance information can be displayed. Exemplary security and compliance information includes whether or not the device has current credentials to access the exchange server, the last image of policy information that was applied to the device, and the remote wipe capability of the device.

The example shown in FIG. 3B is a display (e.g. a webpage that can be presented via a web portal to of a BlackBerry device. In this example, hardware information about the device, including the pin, operating system, memory, other hardware attributes, and the activation date of the device can be displayed. Similarly, device identity information, including device owner, vendor, office of the user, warranty state, purchase date, etc. can be displayed.

FIG. 3C shows an exemplary alert view webpage that can be presented to an administrator through the web portal. In this exemplary embodiment, the administrator can configure various alerts and view devices that trigger certain rule-based alerts. The screen can also display status, rules triggered, time of alert, and appropriate remedial actions.

Figure 4A:
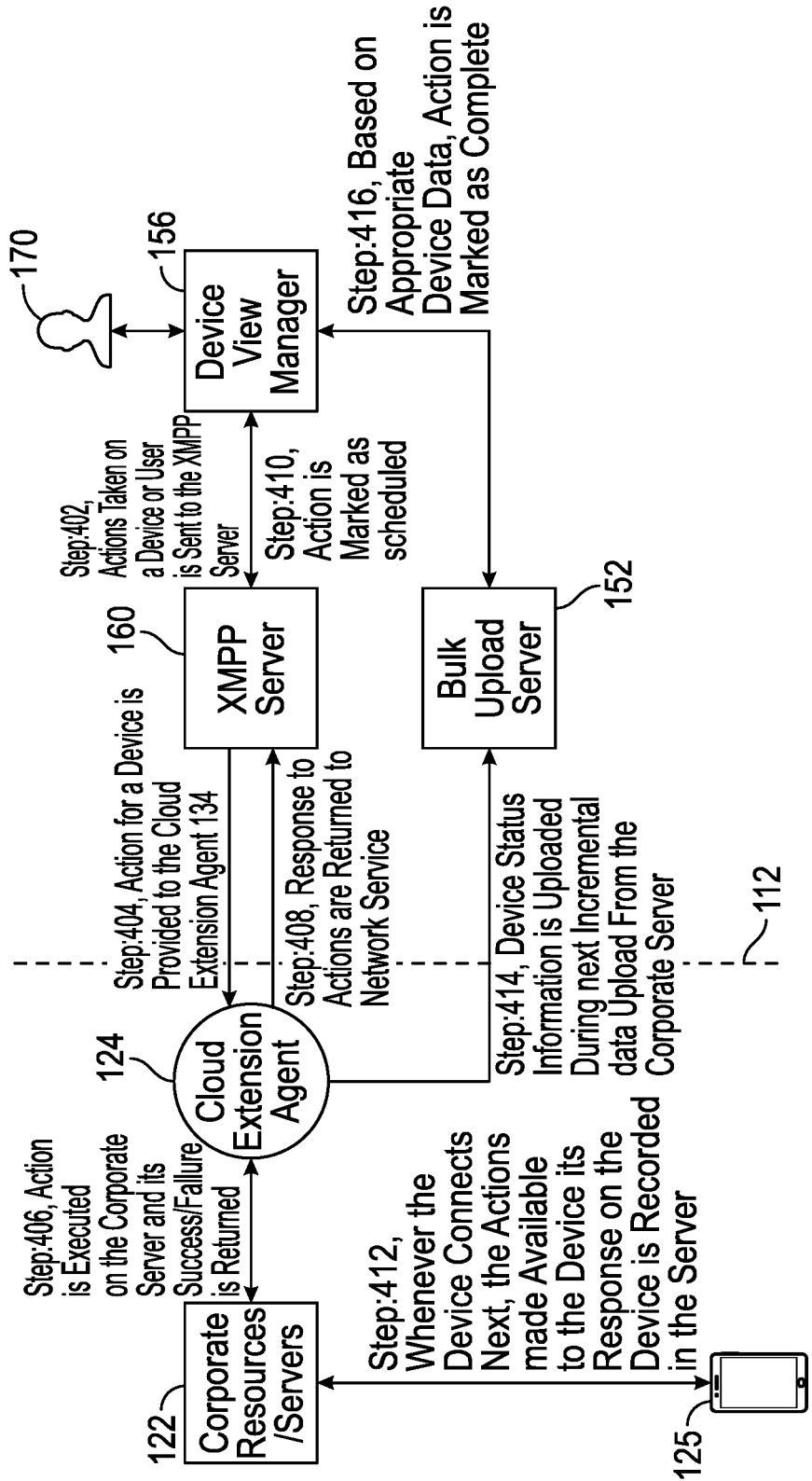
FIG. 4A is a flow chart and system diagram depicting publication of actions to a cloud extension agent for use with certain embodiments of the present invention.

FIG. 4A shows an exemplary publication of actions to cloud extension agent 124 for configuring corporate resources 122. In this example, an administrator 170 interacts with device view manager 156 to initiate certain actions related to a specific device that interacts with corporate servers 122. For example, this execution flow can be used to remotely wipe a device. At step 402 administrator 170 requests a specific advice to be taken on a device of the user. This action is sent to XMPP server 160. In some embodiments, this interaction can be directly between device view manager 156 and XMPP server 160. In other embodiments, device view manager 156 can update the record corresponding to device 125 in device management database 154. For example, a portion of the record for a given device can include a pending action to be taken on the device. XMPP server 160 can access the database and determine that there's a pending action to be taken on the device. As a result of step 402, one or more instructions are created by device view manager, database 154, or XMPP 160 for sending to cloud extension agent 124.

At step 404 XMPP server 160 communicates the action for the device to the cloud extension agent over connection 110. As discussed herein, the connection 110 can be initiated as an outgoing communication to XMPP server 160 from cloud extension agent, 124, but it enables bidirectional communication is substantially real-time to allow commands to be sent from XMPP server 162 cloud extension agent 124.

At step 406 the cloud extension agent 124 executes the commands received from the XMPP server 162 to cause corporate servers 122 to execute a specific action. For example, cloud extension agent 124 can utilize an exposed communication port by a corporate server 122 that is suitable to accept configuration commands. Upon receiving the command from cloud extension agent 124, corporate server 122 can acknowledge the command as well as communicate the failure or success in executing the command received from cloud extension agent 124. In the example of a remote wipe, corporate server 122 can communicate an acknowledgment of the command as well as communicate when the remote wipe has successfully executed or has been successfully scheduled. In some embodiments, the action can be a policy type action that can be executed on the corporate servers 122, without requiring the device to check in to complete the action. For example, a policy requiring all iPhones to have a certain release of the iOS operating system can be applied to corporate servers 122 and can be used by the servers the next time an iPhone device attempts to access corporate resources or servers 122.

At step 408 the response received from corporate servers 122 is communicated by cloud extension agent 124 to the XMPP server using the XMPP protocol over connection 110. This can be a simple acknowledgment that the update to the configuration of corporate servers 122 requested by administrator 170 has been successfully sent to corporate servers 122 and/or executed by corporate servers 122.

At step 410 the XMPP server communicates to the device view manager that the action has been scheduled or executed by the corporate servers 122. This can then be displayed to the administrator, acknowledging that the requested configuration change has been initiated. The communication between XMPP server and device view manager can be direct or through the status information maintained in database 154.

In some embodiments, corporate servers 122 also have entries in the device management database 154, like those of user devices 126. This allows device management database 154 to maintain a model of corporate resources, such as exchange servers, as well as user devices such as mobile devices that access these resources. This information can be used by the various managers to display important information about the overall status of customer premises 120 to administrator 170.

At step 412 whenever a mobile device 125 connects to corporate resources, 122 and a pending actions related to that device can be executed by the corporate servers 122, the response of device 125 can be recorded by corporate servers 122 and communicated via cloud extension agent 124 to bulk upload server 152. This can occur the next time the cloud extension agent updates status information related to individual device 125. For example, where a device is remotely wiped corporate servers 122 can initiate the remote wipe of the device 125, when a user connects to a network or accesses corporate servers. The corporate servers 122 will acknowledge the status change of device 125 and communicate it to the cloud extension agent 124.

At step 414 cloud extension agent 124 communicates with bulk upload server 152, any change in status information related to user device 125, as part of the regular incremental data upload from the corporate server 122.

At step 416 bulk upload server 152 can communicate changes in the status of user device 125 to the device management database 154. Similarly, any previously pending actions that have been taken on device 125 can now be marked as complete in the record related to device 125 in database 154. This information can then be displayed to administrator 170 by any of the various managers.

Figure 4B:
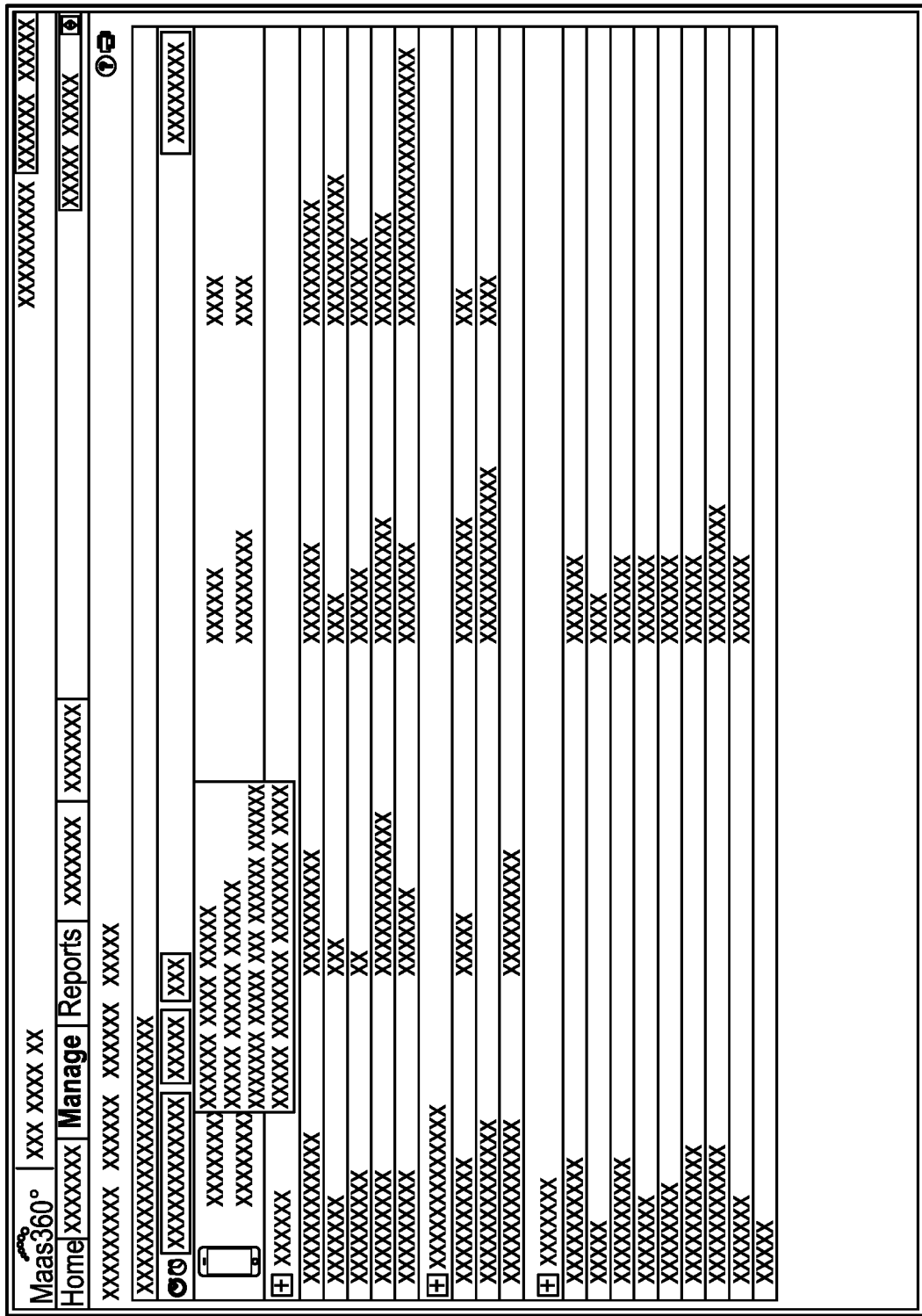
FIG. 4B is a screenshot of available actions that can be displayed via a web portal for use with certain embodiments of the present invention.

FIG. 4B shows an exemplary screen shot for display to administrator via device view manager 156 for presenting available actions pertaining to a specific device 125. Like device views, the available actions for each device can change depending on the type of device, as well as the type of server that the devices connecting to or managed by. These actions can be directed towards a single device or a group of devices. As shown by the drop-down window accessible by the actions tab exemplary available actions for sending to a cloud extension agent include "remote wipe device," "view recovery password," "remove device from exchange server," and "change exchange ActiveSync policy."

Figure 5A:
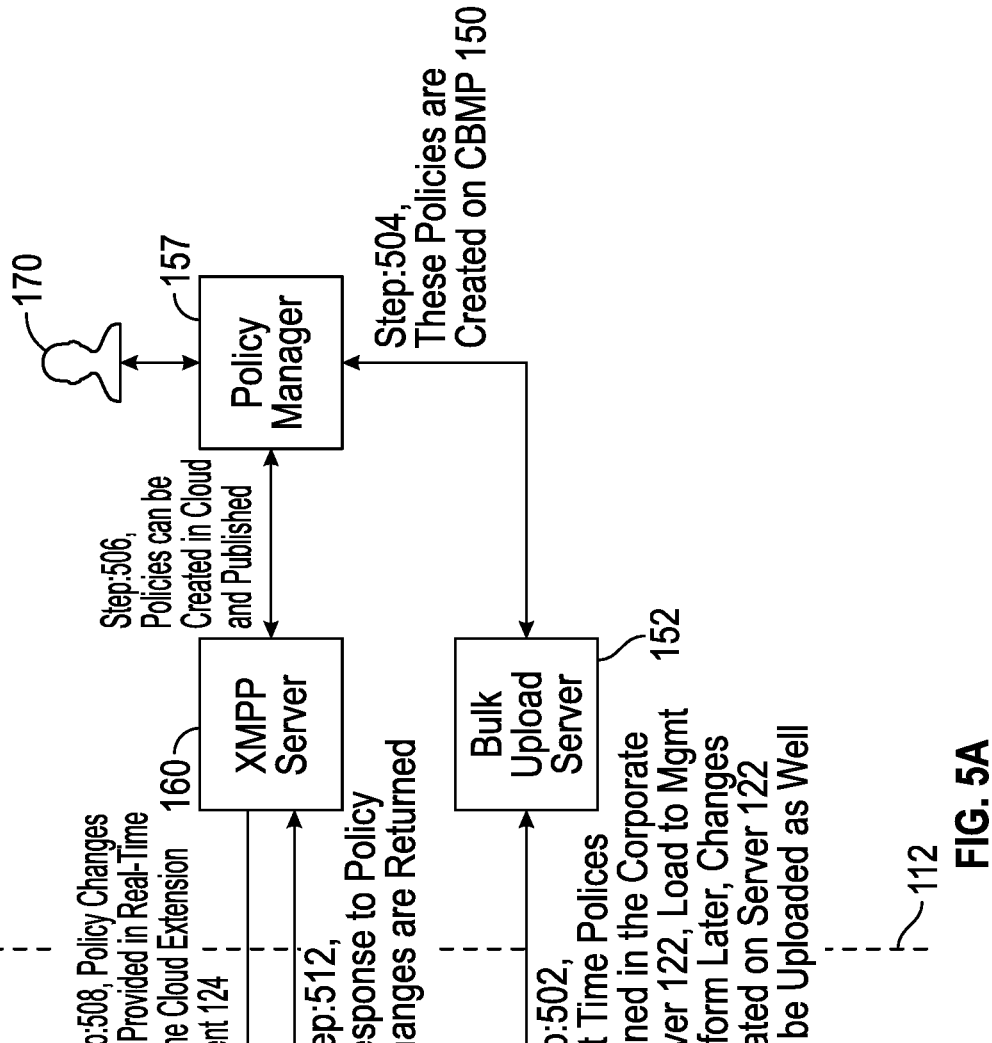
FIG. 5A is a flow chart and system diagram depicting Policy Management flow for updating policies through the web for use with certain embodiments of the present invention.

FIG. 5A shows the Policy Management flow for updating policies through the policy manager 157 by administrator 170. This flow can be used to update the policies that can apply to one or more user devices 126, to ensure security compliance of user devices. At step 502 cloud extension agent 124 uploads the current image of policies on the corporate resource servers 122 via the bulk upload server 152. This can be via an HTTP outbound connection to bulk upload server 152. At step 504 bulk upload server stores the policies in the database of cloud management platform 154 interaction with policy manager 157.

Administrator 170 accesses policy manager 157 via a web interface to view existing policies for corporate servers 122, and can further change or publish new policies by the web interface. At step 506, any changes to existing policies or new policies created by administrator 170 via the policy manager 157 can be published. In some embodiments, policy manager 157 will store the changes in the policy to device management database 154. XMPP server 160 will notice changes in the database or will receive messages from policy manager 157 regarding the policy changes or new policies.

At step 508 the XMPP server 160 uses connection 110 to begin publishing the policy changes to cloud extension agent 124. Because the XMPP protocol is used over a secure connection policy, changes can occur in substantially real-time.

At step 510 upon receiving the policy changes from the XMPP server, cloud extension agent 124 interacts with corporate server 122 to change the configuration of policies on the server. This interaction between cloud extension agent 124 and corporate server 122 can be through any appropriate means known in the art, including an API or open communication port.

At step 512 cloud extension agent 124 reports back to XMPP server 160 that the policy change has been made. XMPP server 160 can, in turn, update device manager database 154 to reflect the change in status of the policy of corporate server 122.

At step 514 corporate server 122 applies the policy to any devices that subsequently connect to the resources. Corporate server 122 can then report the change in status of the device connecting to cloud extension agent 124 for sending to bulk upload server 152 to update the status information of the individual mobile device for which the policy has been applied.

The available policies for selection by an administrator 170 depend on the type of product being managed by the cloud-based management platform. However, because the cloud-based management platform is designed in some embodiments to be extensible to allow integration with many types of third-party products and servers on customer premises 120, cloud-based management platform 150 can enable definition of broad classes of policies, dynamically without downtime in the third-party products being managed. For example, cloud extension agents 124 can be extensively configured, to interact with many third-party servers or applications. They can include the ability to interact with APIs for various third-party network products. Because the policy publication flow contemplates acknowledgment of policies deployed by cloud extension agent 124, cloud extension agents 124 can effectively synchronize policies amongst third-party network applications being managed. Effectively, these third party applications (e.g. corporate servers 122 and applications running thereon) can be configured as if they were being administered locally, and may not have any awareness that the cloud-based management platform is initiating policy Management.

Figure 5B:
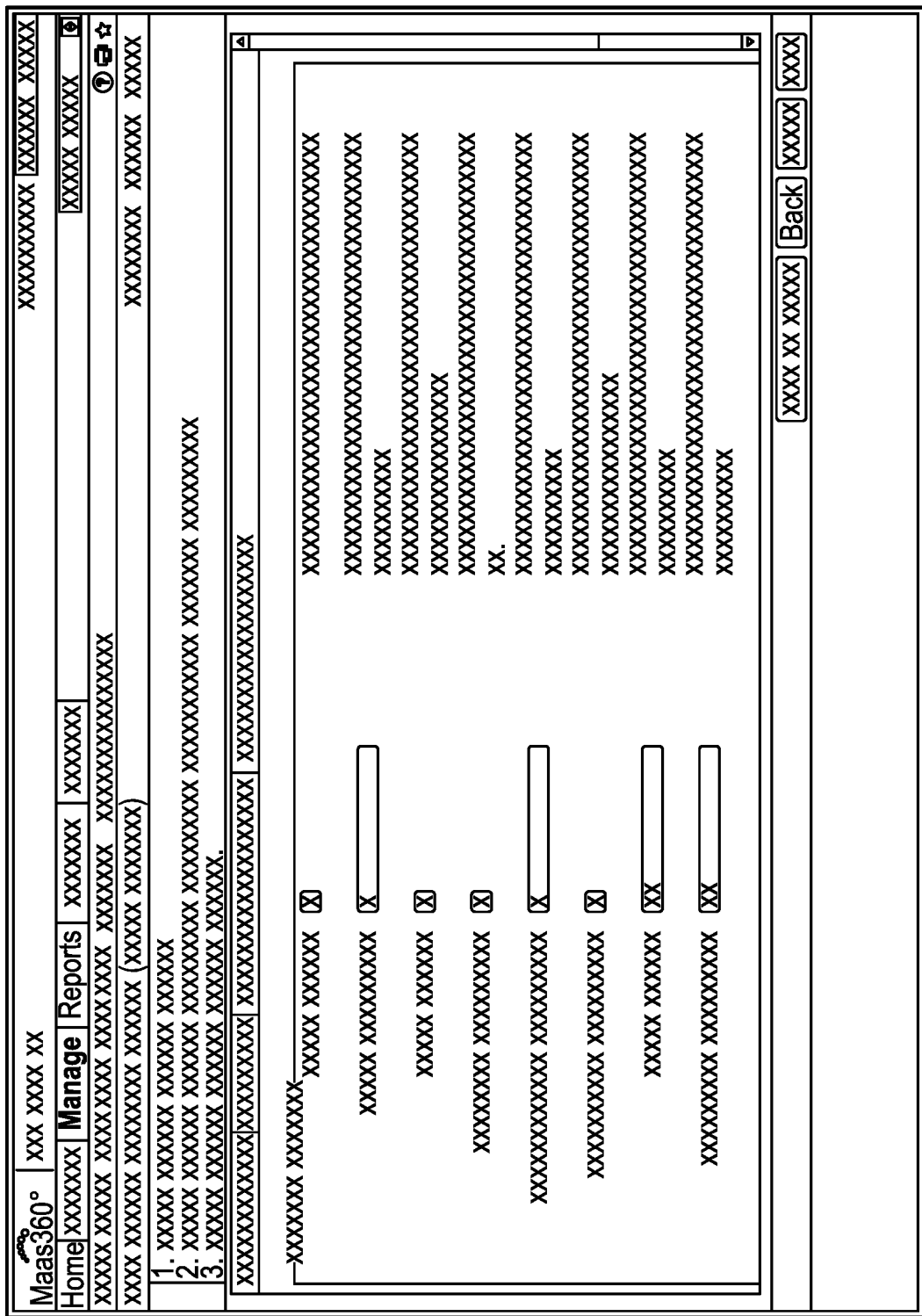
FIG. 5B is a screenshot of exemplary policy definition views that can be displayed via a web portal for use with certain embodiments of the present invention.

FIG. 5B shows an exemplary policy definition webpage that is displayed to administrator 170. In this exemplary policy, the administrator is configuring the policy related to an Exchange ActiveSync policy. Here, the administrator may require a password, require a minimum password length, allow a simple password, require an alphanumeric password, require a minimum number of complex characters, limit the number of failed attempts before a device will be locked, enforce a password history to require that passwords are not repeated, and require a given maximum time that a device can be unlocked before automatically locking.

Table 1 below identifies exemplary use cases and system behaviors for defining and synchronizing policies for certain administrative situations that are suitable for use with embodiments of the present invention, where the cloud-based management platform is MaaS360®.

TABLE 1

| Usecase | | System Behavior |
|---|---|---|
| New Customer Onboarding | 1. | Details of all policy sets and their values is extracted from 3rd party MDM Server (e.g. one of corporate servers 122) and uploaded to MaaS360 ® (e.g. cloud-based management platform 150) |
| | 2. | With this information, appropriate policy sets are created in MaaS360 ® and these are "Pseudo-published" so that the updates are not sent down to 3rd party MDM server again but policy set becomes available in MaaS360 ® for assignment. On pseodu-publish, an audit record is created with source of change being 3rd party MDM server |
| New Policy Set created in 3$^{rd}$ party MDM Server | 1. | Details of this new policy set & its values is extracted from 3rd party MDM Server and uploaded to MaaS360 ® |
| | 2. | With this information a new policy set is created in MaaS360 ® and "Pseudo-published" |
| New Policy Set is created in MaaS360 ® | 1. | Create a new Policy Set. On publishing the same, the information is sent to 3rd party MDM Server where the policy set is created |
| | 2. | If policy set exists with the same name on the 3rd party MDM server, the same is edited with the settings of the Policy set from MaaS360 ®. Also, a response is sent back to MaaS360 ® about overriding an existing policy set in 3rd party MDM server. The Policy set in MaaS360 ® then becomes available for assignment |
| | 3. | Else, a new policy set is created in 3rd party MDM server and a success response is sent back. However this new policy set is not uploaded back to MaaS360 ®. On success response from MaaS360 ®, the same becomes available for assignment |
| Change in values of a Policy set in 3rd party MDM server | 1. | Changes to the policy set is extracted from 3rd party MDM Server and uploaded to MaaS360 ® |
| | 2. | Make updates to the Policy set in MaaS360 ® and "Pseudo-publish" this |
| Change in values of Policy Set in MaaS360 ® | 1. | On editing and publishing the same, the information is sent to 3rd party MDM Server along with last published policy set. |
| | 2. | If policy set being edited no longer exists and error message is returned |
| | 3. | The Policy set on the 3rd party MDM Server is compared against the last published policy set. If both are same, the new changes are applied and a success response is sent back. Else the new changes are applied and a message is sent to inform the administrator about overriding the policies |

TABLE 1-continued

| Usecase | System Behavior |
|---|---|
| Delete a policy set in 3rd party MDM server | 1. Information about Policy set being deleted in 3rd party MDM Server is uploaded to MaaS360 ®<br>2. The Policy set is deactivated in MaaS360 ® and its name changed to <<Original Policy Name>>(Deleted on <<timestamp of deactivation>>). For ex: "Corporate Policy Set" after deactivation becomes Corporate Policy Set (Deleted on 09/01/2010 10:15 a.m.) |
| Deactivating a policy set in MaaS360 ® | 1. If any device is assigned the policy set or policy set is default, then it cannot be de-activated<br>2. The Policy set is deactivated in MaaS360 ® and its name changed to <<Original Policy Name>>(Deleted on <<timestamp of deactivation>>)<br>3. The action is triggered to delete the Policy set in 3rd party MDM server |
| Edit Policy Set name in 3rd party MDM server | 1. Change in Policy Set name is detected by a Policy Set with the same GUID but different name<br>2. This information about change to Policy Set name is uploaded to MaaS360 ® where the same is updated |
| Edit Policy Set name in MaaS360 ® | 1. The new Policy Set name for the GUID is sent to the 3rd party MDM server. The policy set name is changed, if supported. Else an error is returned. |
| Mark a Policy set as default in 3rd party MDM server | 1. Information about new Default policy set is uploaded to MaaS360 ® and is updated in MaaS360 ®<br>2. Information about changes to Device to Policy assignment gets uploaded via regular Device information uploads |
| Mark a Policy set as default in MaaS360 ® | 1. The administrator is shown a warning that all devices with default policy will automatically be assigned the new default policy<br>2. The Policy set is marked as default in MaaS360 ®<br>3. The action is triggered to mark the Policy set as default in 3rd party MDM server. Resulting changes in Device to Policy assignment gets uploaded via regular Device information uploads |
| Re-installation of MaaS360 ® Cloud Extension Agent on 3rd party MDM server | 1. Details of all policy sets and their values is extracted from 3rd party MDM Server and uploaded to MaaS360 ®.<br>2. For existing Policy sets, the changes are made. New Policy sets are created and "Pseudo-Published"<br>3. Deleted Policy sets are deactivated in MaaS360 ® |

FIG. 6A is an exemplary screen shot of a cloud extension agent configuration view that can be displayed via a webpage to an administrator 170. This page can act as administrative console that helps administrators to centrally control, manage, and upgrade cloud extension agents. It can display all cloud extension agents installed by a customer and can outline for resources integrated into those cloud extension agents, as well as their configuration settings. This page can allow real-time actions, such as testing and 10, the conductivity, on-demand data refresh, etc., that can be taken on a cloud extension agent. This screen can also support alerts in the event a cloud extension agent becomes nonoperational or encounters configuration problems.

This screen can be used to configure the individual properties of the cloud extender itself. In this example, the cloud extender is configured to interface with an exchange ActiveSync server and provide visibility services about users. The screen can display timestamps related to when the cloud extension agent last reported, when it was installed, when the configuration was last modified, and when the agent was activated. The screen can also display information about who created the agent, the domain in which the agent operates, and proxy settings of the agent. The screen can also show information about the hardware on which the agent is operating. In this example, the hardware is a Microsoft Windows server 2008 server operating a MaaS360® cloud extender service package. Information about the version information and available resources on the hardware can also be displayed.

FIG. 6B is another exemplary view of a cloud extension agent that can be displayed to administrator 170. Here, the information is specific to the exchange ActiveSync server configuration utilized by the cloud extension agent. This information can include the version of exchange server being used, status information about the ActiveSync server being interfaced via the cloud extension agent, quarantine settings of the exchange ActiveSync server, and exchange server statistics, such as mailbox statistics.

Figure 7:
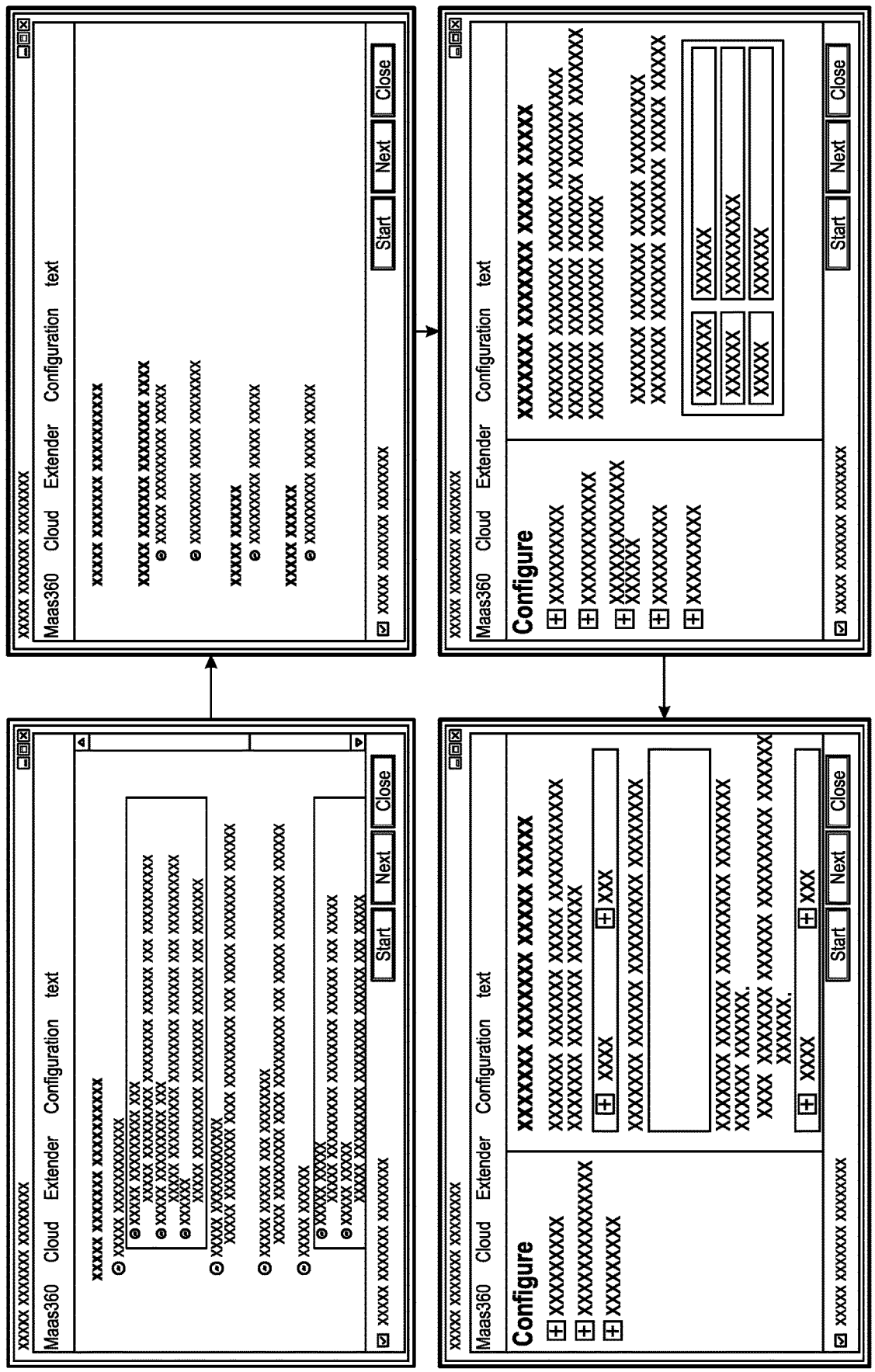
FIG. 7 is a flow of screenshots of exemplary cloud extension agent configuration views that can be displayed via a web portal for use with certain embodiments of the present invention.

FIG. 7 shows a plurality of screens that can be deployed as a wizard for configuring a cloud extension agent via a webpage. In some embodiments, the configuration settings selected can be stored directly in the cloud extension agent created, rather than on the cloud. A first screen allows an administrator 170 to select the types of corporate servers that the cloud extension agent will interface. In this example, the selected servers include an exchange ActiveSync server, a Lotus traveler manager server, a BES, and a server containing user authorization information.

An exemplary next display screen includes information about the prerequisites for integrating the cloud extension agent with corporate servers. This screen can be used to display the requirements needed by an agent, and or the server to successfully integrate. For example, in exchange ActiveSync server may require a certain version of PowerShell. The server may also require certain versions be used.

Basic settings, such as username, password, and domain information for accessing the cloud extension agent, can be displayed to the administrator in a next screen. Finally, advanced settings can be displayed, including configuring the mailboxes for use by the cloud extension agent.

Figure 8A:
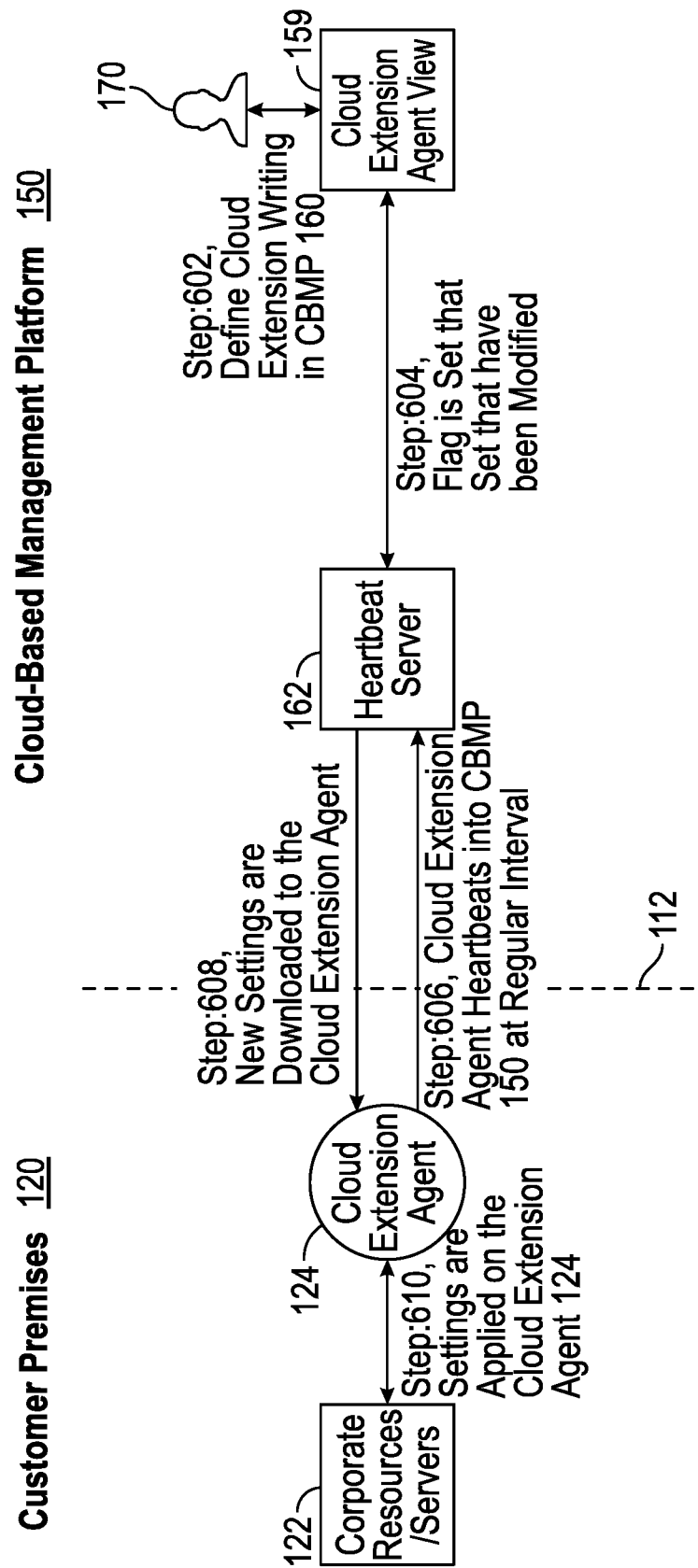
FIG. 8A is a flow chart and system diagram depicting configuration of cloud extension agents through the web for use with certain embodiments of the present invention.

FIG. 8A shows exemplary flow for managing a cloud extension agent. Here, the administrator will interact with the cloud extension agent view 159 via a web portal. At step 602 the administrator can define cloud extension settings in the cloud-based management platform 150. The webpage(s) displayed to administrator 170 can be any of those in FIG. 6A, 6B, 7, or 8B, or any other appropriate configuration.

At step 604, the settings are placed into the device management database 154, and any changes are noted in the database. These changes can be communicated to heartbeat server 162. This allows changes in settings to be noted by cloud extension agent next time the cloud extension agent checks in with the heartbeat server 162.

At step 606 cloud extension agent 124 connects to the heartbeat server at a regular polling interval. Upon connecting to the heartbeat server 162, the cloud extension agent notices that the settings have changed. At step 608 the new settings are downloaded to the cloud extension agent from heartbeat server 162.

At step 610 any changes and settings are applied to the cloud extension agent. The cloud extension agent can then begin operating with those updated settings. In this manner, administrator 170 may update cloud extension agent settings via a web interface and within a few minutes, depending on the polling interval, have those changes sent to the cloud extension agent operating on customer premises 120.

Figure 8B:
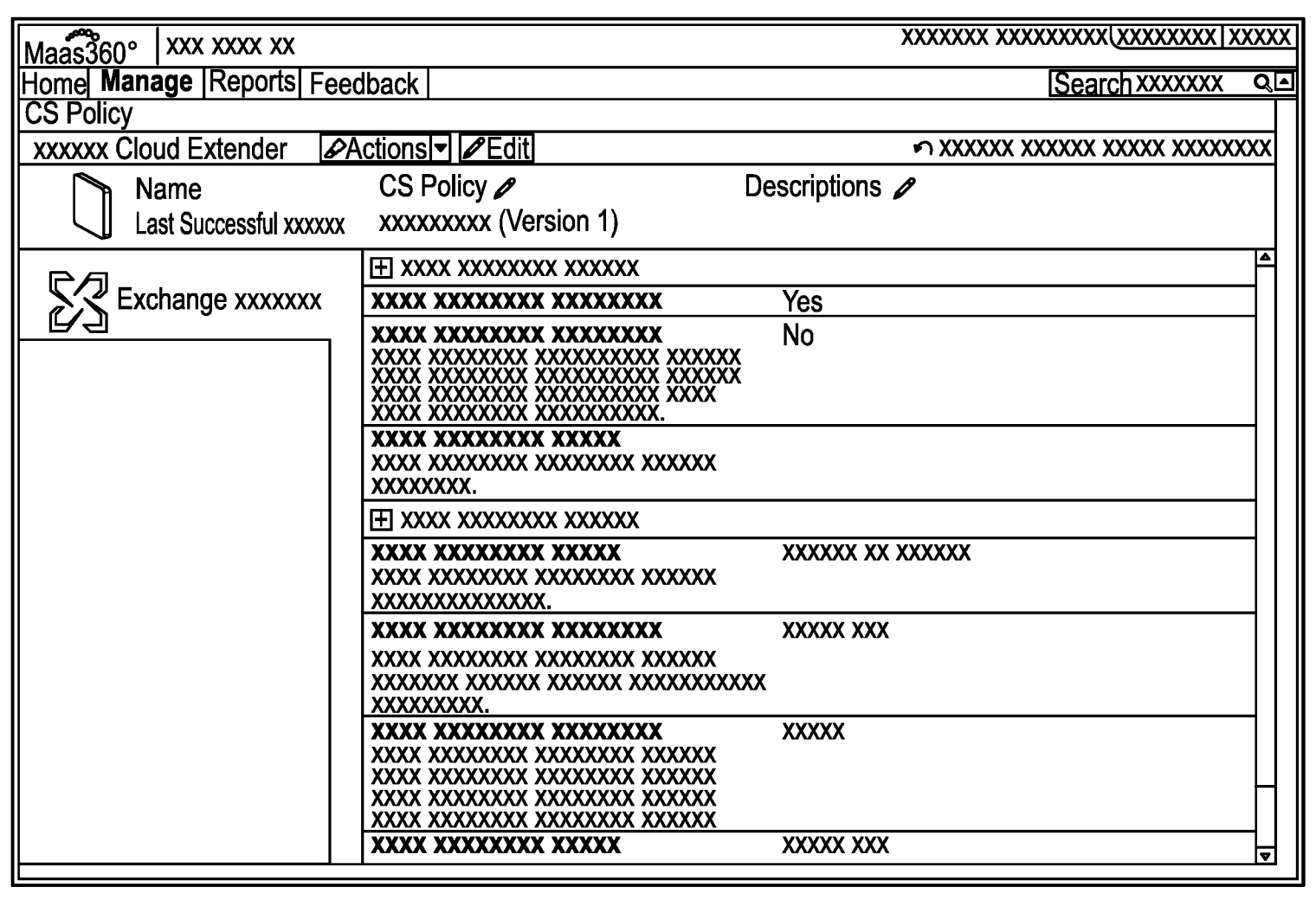

FIG. 8B shows an exemplary screen shot of a webpage that may be displayed to an administrator for updating settings on the cloud extension agent. Exemplary settings here include a cloud extension policy that defines how to handle devices that need to be quarantined. In this example, auto quarantines of devices are enabled. Here, this policy is automatically approved for all existing devices. The policy can also be published to all users e-mail addresses to notify users when their devices are quarantined. The policy can also define the data query frequency for communicating with the exchange server for determining status information of connected devices. An administrator can also define the heartbeat interval for communicating with the heartbeat server. An administrator can also define a weekly time when an entire snapshot of all devices will be collected and sent to the bulk upload server.

Figure 9:
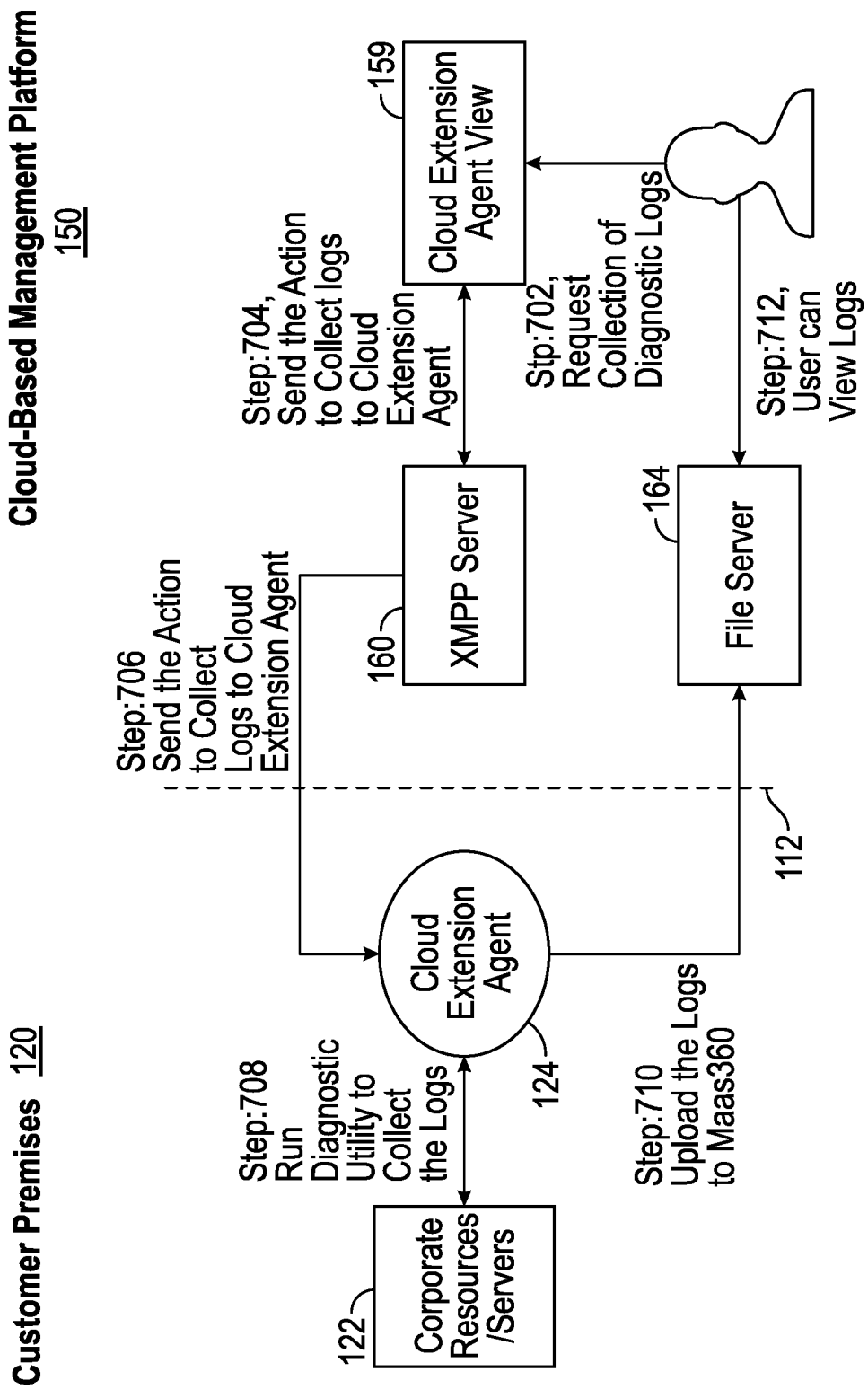
FIG. 9 is a flow chart and system diagram depicting remote diagnosis of cloud extension agents and resources through the web for use with certain embodiments of the present invention.

FIG. 9 shows an exemplary flow for remote diagnosis of any cloud extension agents or corporate resources or servers. By enabling remote diagnosis of components of customer premises 120, management of a corporate network can be effectively moved to the cloud and outsourced. This has inherent advantages, including scalability, and the ability to operate a corporate network as a turnkey operation without having to necessarily hire an entire IT staff.

Remote diagnosis can be used to address multiple areas for potential failure within a network management system. A remote diagnosis flow can provide a mechanism to collect and diagnose all aspects of network management system through logs that are gathered from customer premises without manual intervention from the customer. The remote diagnosis flow can include on-demand actions taken by the cloud extension agent to create diagnostic logs for review by cloud-based management platform 150. This can include a log collection utility accessible to the cloud extension agent 124 that runs in the background without visible display, notification, etc. on the customer premises.

In the example shown in FIG. 9 administrator 170 can interact with cloud extension agent view 159 to define which log information the cloud extension agent should collect, at step 702. This log information can relate to status information of a cloud extension agent, or to the corporate resources or servers that the cloud extension agent interfaces.

At step 704, the cloud extension agent view interacts with XMPP server 160, such as through a database 154, to communicate the actions related to collecting logs requested by administrator 170.

At step 706, the XMPP server sends the actions needed to collect logs to the cloud extension agent via connection 110. At step 708 cloud extension agent, 124 runs diagnosis utilities or any other actions specified by the XMPP server to collect the requested logs. In some examples, the log information can be collected from corporate servers 122. However, in some instances, the log information can be collected from cloud extension agents themselves. In some embodiments, step 706 can be performed by the heartbeat server 162, instead of the XMPP server 160.

At step 710 any long information that is collected by the cloud extension agent 124 can be uploaded to the network based management platform, such as MaaS360®, via file server 164. Because this log information can be quite large, in some embodiments, a separate file server 164 is provided to allow bulk upload a large log files without interfering with the other connections to the cloud extension agent. In some embodiments, the file server 164 can be provided in a different data center than the rest of network management platform 150 to allow flexibility of administrator 172 collect log files in any manner in which he chooses.

At step 712 administrator 170 can view the log files uploaded to file server, 164. This view can be a direct text level view of the log files provided, which can be in a specified format, or via a web interface that is similar to the other views provided, such as that provided by cloud extension agent view 159.

Figure 10:
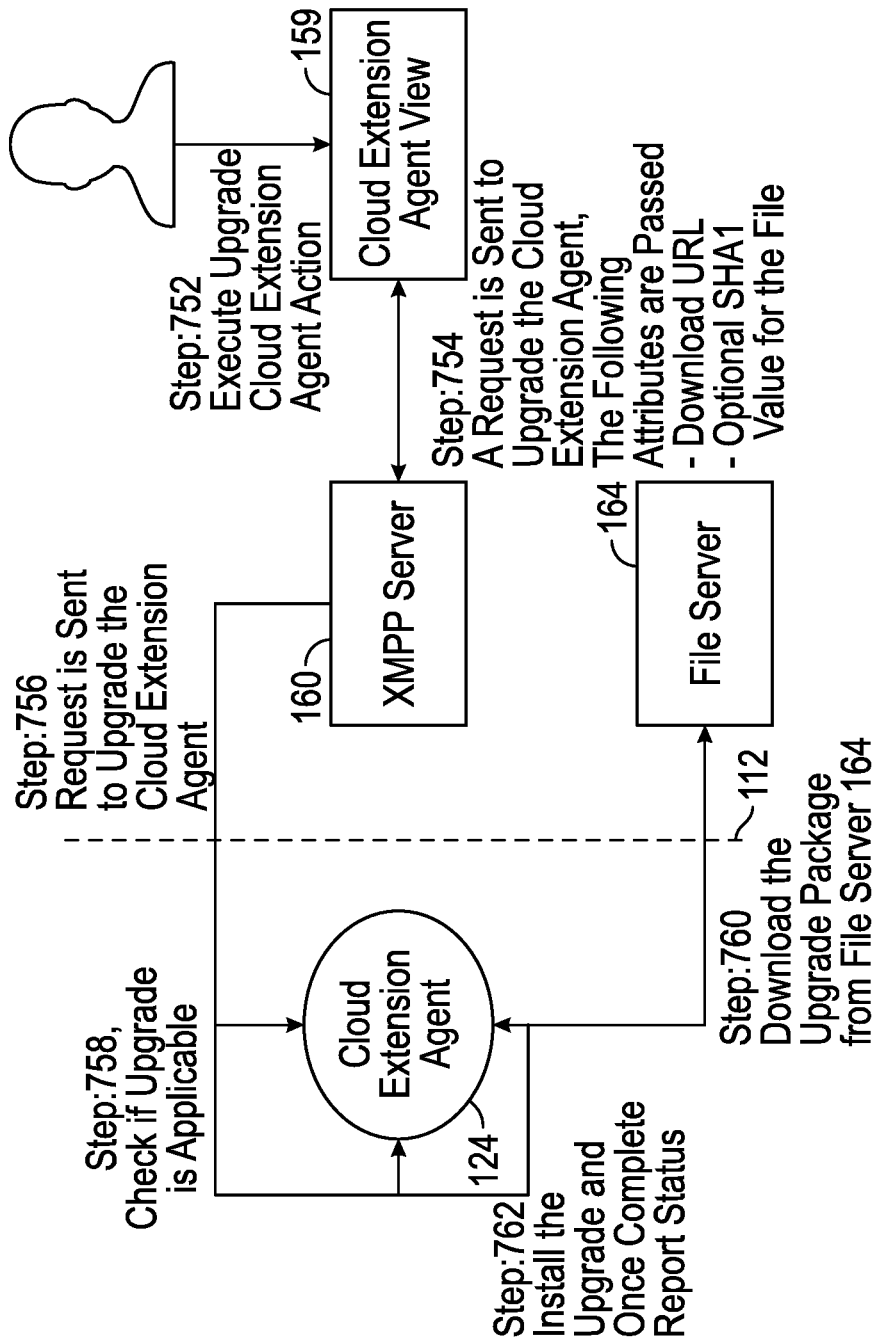
FIG. 10 is a flow chart and system diagram depicting remote updates of cloud extension agents and resources through the web for use with certain embodiments of the present invention.

FIG. 10 shows an exemplary flow for a remote upgrade of a cloud extension agent 124. Here, administrator 170 can utilize a web portal to cause a cloud extension agent to upgrade the software that it is running. At step 752 administrator 170 interacts with cloud extension agent view 159 to cause it to execute a cloud extension agent action relating to upgrading the software utilized by the cloud extension agent.

At step 754 cloud extension agent view 159 interacts with XMPP server 160, such as via device management database 154, to inform the XMPP server 160 that cloud extension agent 124 needs to execute actions relating to upgrade its software. These actions can include defining a URL for downloading the upgraded software, and may include a security password or an SHA1 value, for verifying the identity of the agent or the file before accessing the file. In this manner, the cloud extension agent can verify that the software it downloads for upgrading is from a verified source. This can prevent attacks to the cloud extension agent whereby a cloud extension agent could be maliciously made to download and improper or more vulnerable software image from a fake file server.

At step 756 the requested action is sent to cloud extension agent 124 from XMPP server 160 over connection 110. Upon receiving the upgrade action from XMPP server 160, cloud extension agent 124 checks to determine if the requested upgrade is applicable to cloud extension agent 124 at step 758. In some embodiments, step 756 can be performed by the heartbeat server 162, instead of the XMPP server 160.

At step 760 if the upgrade is applicable to cloud extension agent 124, it connects to file server 164 to download the upgrade package needed to install any updates to cloud extension agent 124 and its software. At step 762 the upgrade is installed and the completed status is reported to XMPP server 160 or to upload server 152.

By providing a remote upgrade flow, cloud-based management platform 150 can allow remote administration of cloud extension agent 124 without requiring administrators of customer premises 120 to actively manage cloud extension agents on the customer premises. This allows outsourcing of device management to a cloud-based organization and can allow organizations to successfully manage their networks without the need to hire large internal IT staffs.

Another aspect of some embodiments of the present invention is inability to provide load balancing and failover capabilities amongst multiple cloud extension agents. For large deployments where a customer premises is large or the need for network management is great, load balancing can be an appropriate solution. In some embodiments, load balancing is accomplished by having multiple active cloud extension agents operating at any given moment. In some embodiments, customer premises may be divided into multiple regions to allow separate network management domains to be created to reduce management overhead. In these configurations, each active cloud extension agent uploads information and participates in the management of only those resources within the customer premises assigned to each cloud extension agent. The network management platform can use that association to determine which cloud extension agent to send a given action.

Figure 11:
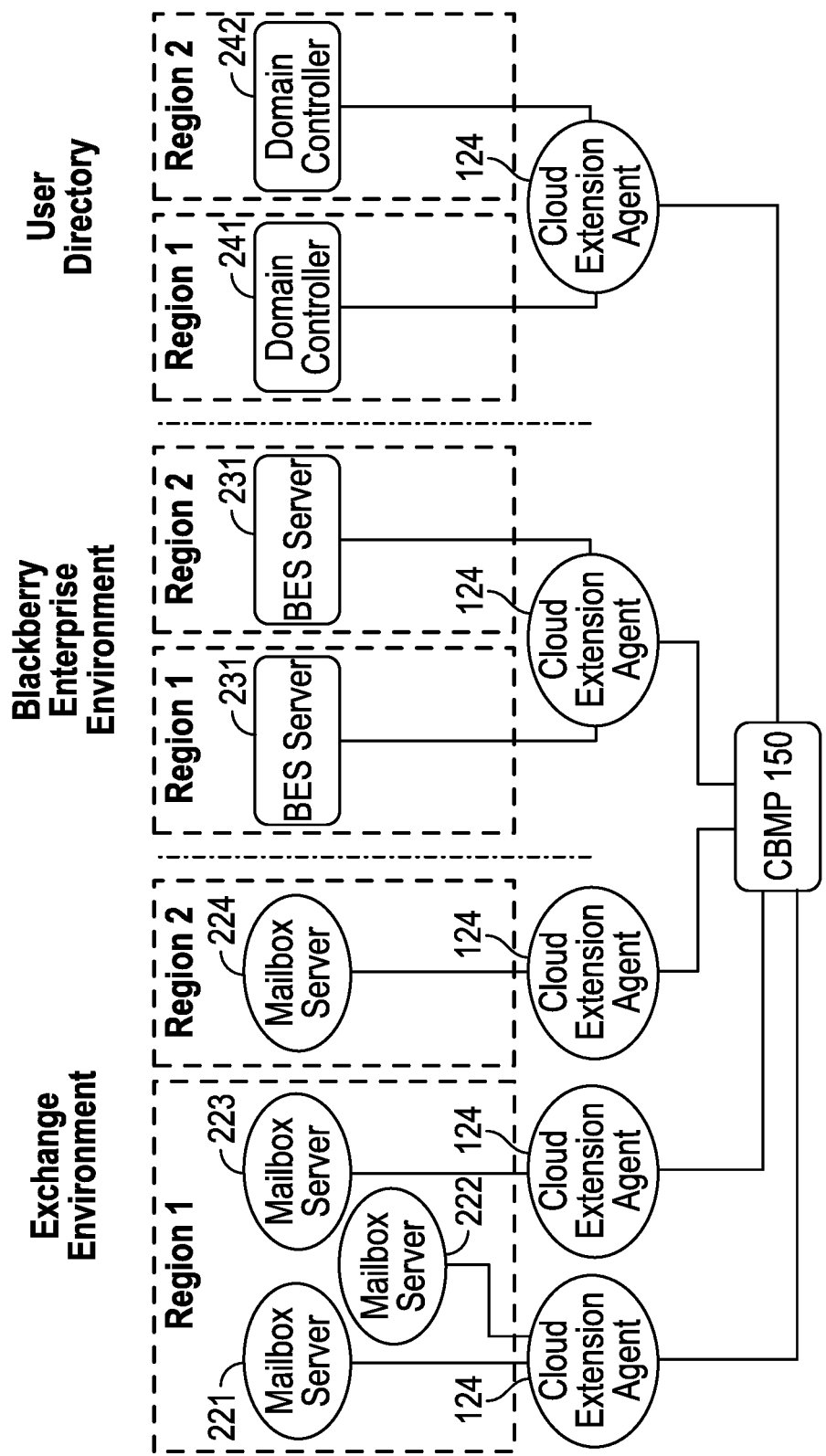
FIGS. 11 and 12 are system diagrams of an exemplary cloud-based management system configuration suitable for use with certain embodiments of the present invention.

FIG. 11 shows an exemplary installation of multiple cloud extension agents 124 across multiple server environments in a corporate network. In this example, cloud-based management platform 150 provides management services to five cloud extension agents for a single organization. (It should be noted that in some embodiments a single cloud-based management platform can be used to supply services to many organizations simultaneously, but still provide virtual private services to each organization.) Here, three cloud extension agents interact with servers in an Exchange environment. The exchange environment for this organization can be divided into two regions. These regions can be geographic in nature, such as a single region being for a single office of an organization, or can be divided in any other manner suitable for the organization.

In this example, Region 1 includes three mailbox servers 221, 222, and 223. Mailbox servers to 21 and mailbox server 222. Interface with a single cloud extension agent. Meanwhile, mailbox server 223 interacts with a different cloud extension agent. In this regard, Region 1 is managed by to cloud extension agents. Region 2 and mailbox server to 24 are managed by a single cloud extension agent.

A blackberry enterprise server environment can also be applied to Region 1 and Region 2. In this example, a single blackberry enterprise server 231 manages both Region 1 and Region 2. A single cloud extension agent interfaces with the BlackBerry enterprise server 231.

Region 1 and Region 2 can also have separate domain controllers for maintaining user credentials within each region. These domain controllers can interact with one or more cloud extension agents.

Figure 12:
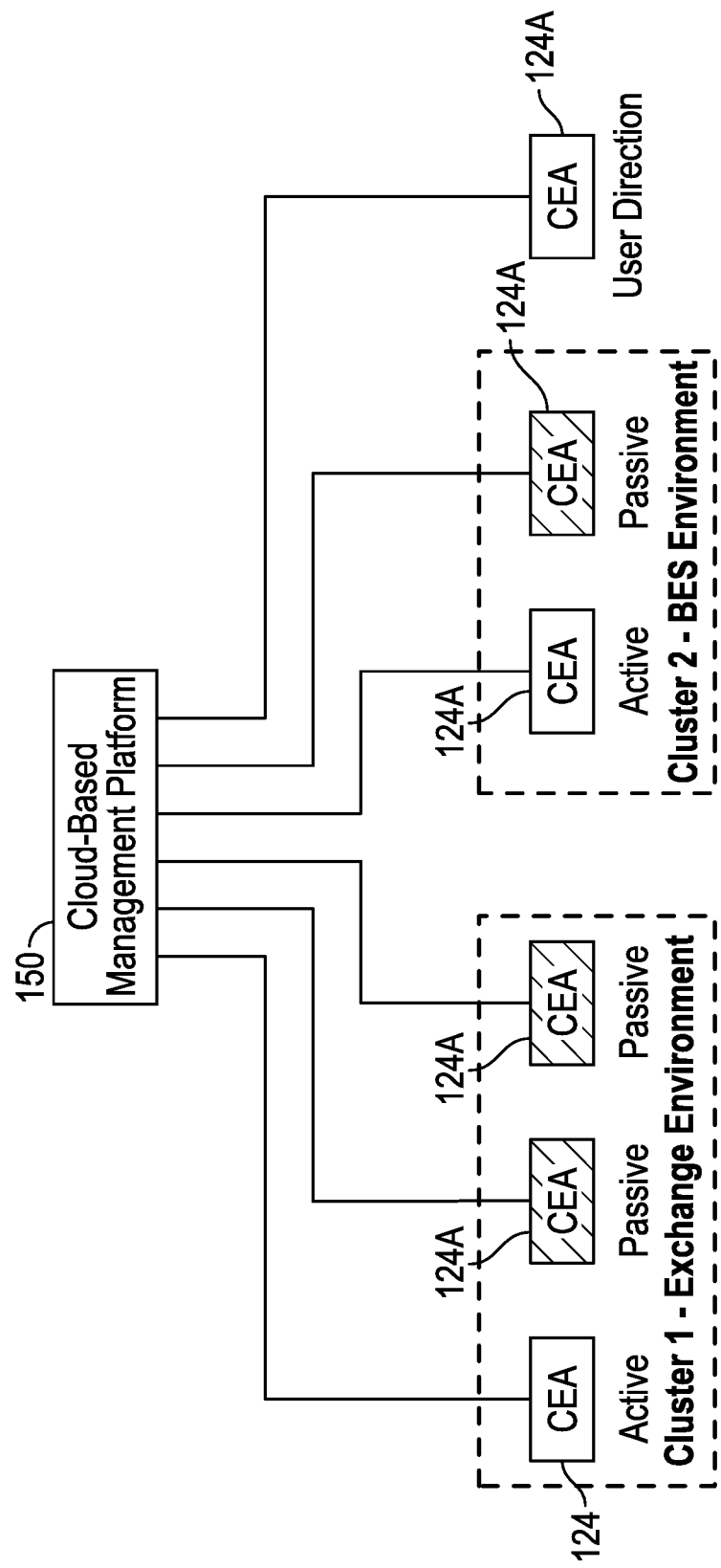

Similarly, a network management platform can interact with multiple active and passive clusters of cloud extension agents. Cloud extension agents can be active or passive to allow for failover, redundancy. For example, in FIG. 12, a single network management platform interacts with three cloud extension agents within an Exchange server cluster. Of these three cloud extension agents, a single cloud extension agent is active, while two cloud extension agents are fully configured and operating, but are passive to be ready in case the active cloud extension agent fails. It should be appreciated, that is some embodiments, multiple active cloud extension agents may be employed to allow for load-balancing or scalability. Similarly, within a BES cluster a passive and active cloud extension agent can be employed. In this example, a single cloud extension agent is provided, without a fail-over/passive cloud extension agent, to supervise a user directory server.

By providing a failover cloud extension agent, a network management system can provide high-availability management of customer premises. This can include a watchdog service where each cloud extension agent observes other cloud extension agents to ensure that they remain operational. If one cloud extension agent notices that another cloud extension agent has stopped working, the observing cloud extension agent can restart the stopped cloud extension agent. In this manner, passive cloud extension agents surveyed dual-purpose role of watchdog agents as well as providing failover capability. Furthermore, in the event that there are multiple passive cloud extension agents, these agents can be assigned priorities, such that the highest priority cloud extension agent available can take over for a failed cloud extension agent.

Figure 13:
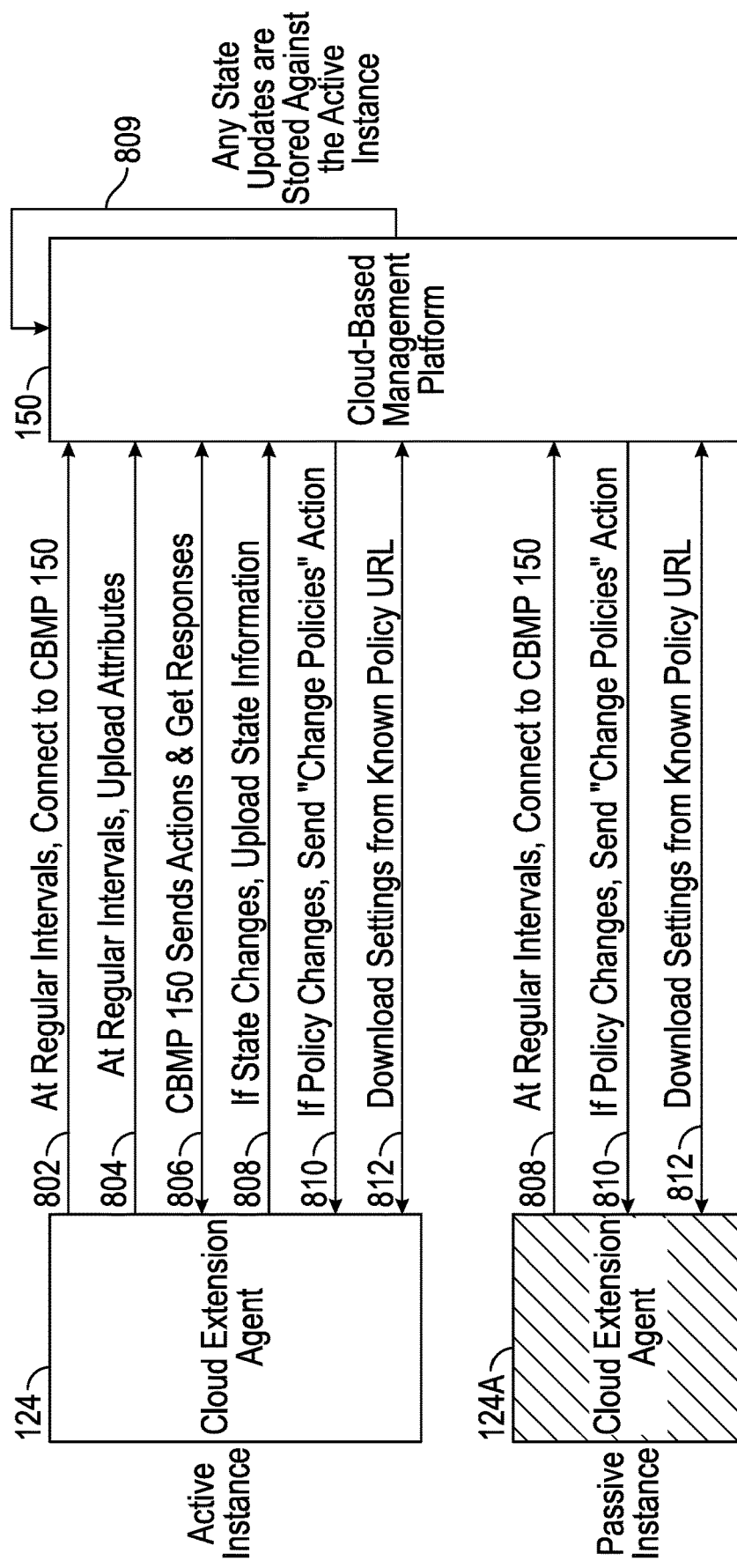
FIG. 13 is a flow chart and system diagram operation of cloud extension agents for use with certain embodiments of the present invention.

FIG. 13 shows the exemplary flow for handling failover configurations that involve an active instance and a passive instance of a cloud extension agent. Here, active cloud extension agent 124 communicates with the network management platform 150 as described throughout this description. Meanwhile, the passive instance of cloud extension agent 124A maintains information sufficient to allow it to take over the active role of cloud extension agent 124 should the need arise.

At step 802 at regular intervals both cloud extension agents will connect to the cloud-based management platform 150. This can include, for example, connecting to the heartbeat server 162. This allows cloud-based management platform 150 to maintain information and configuration or settings for all cloud extension agents, regardless of whether each cloud extension agent is active or passive.

At step 804 the active instance of cloud extension agent 124, will connect at regular intervals to cloud-based management platform 152 and upload attribute information about devices and servers that the cloud extension agent is managing. This step can be performed by interacting with bulk upload server 152. At step 806, cloud-based management platform 150 sends actions to cloud extension agent 124, as discussed throughout this specification. At step 808, if state information pertaining to the cloud extension agent is reported to the cloud-based management platform 150. Status information can include any information about the status of pending actions, settings, the current status of any resources being monitored or managed, etc. Similarly, any changes in the settings to the cloud extension agent can be reported at step 808. At step 809 any state changes reported by cloud extension agent 124 are stored in a local database to maintain status information of active cloud extension agents. Any changes are noted in the in records pertaining to active instance 124.

At step 810 any policy changes initiated by an administrator are pushed out to active and passive cloud extension agents. Here, the XMPP server will send a change policy action to both active and passive cloud extension agents. This ensures that passive cloud extension agents also maintain up-to-date policy information so that they are ready to become active, should the need arise.

At step 812 any policy settings or other update information can also be sent to both active and passive cloud extension agents. In some embodiments, policy changes can be initiated by an instruction received from the XMPP server and completed by a cloud extension agent by downloading a policy from a URL indicated in the message received from the XMPP server.

Figure 14:
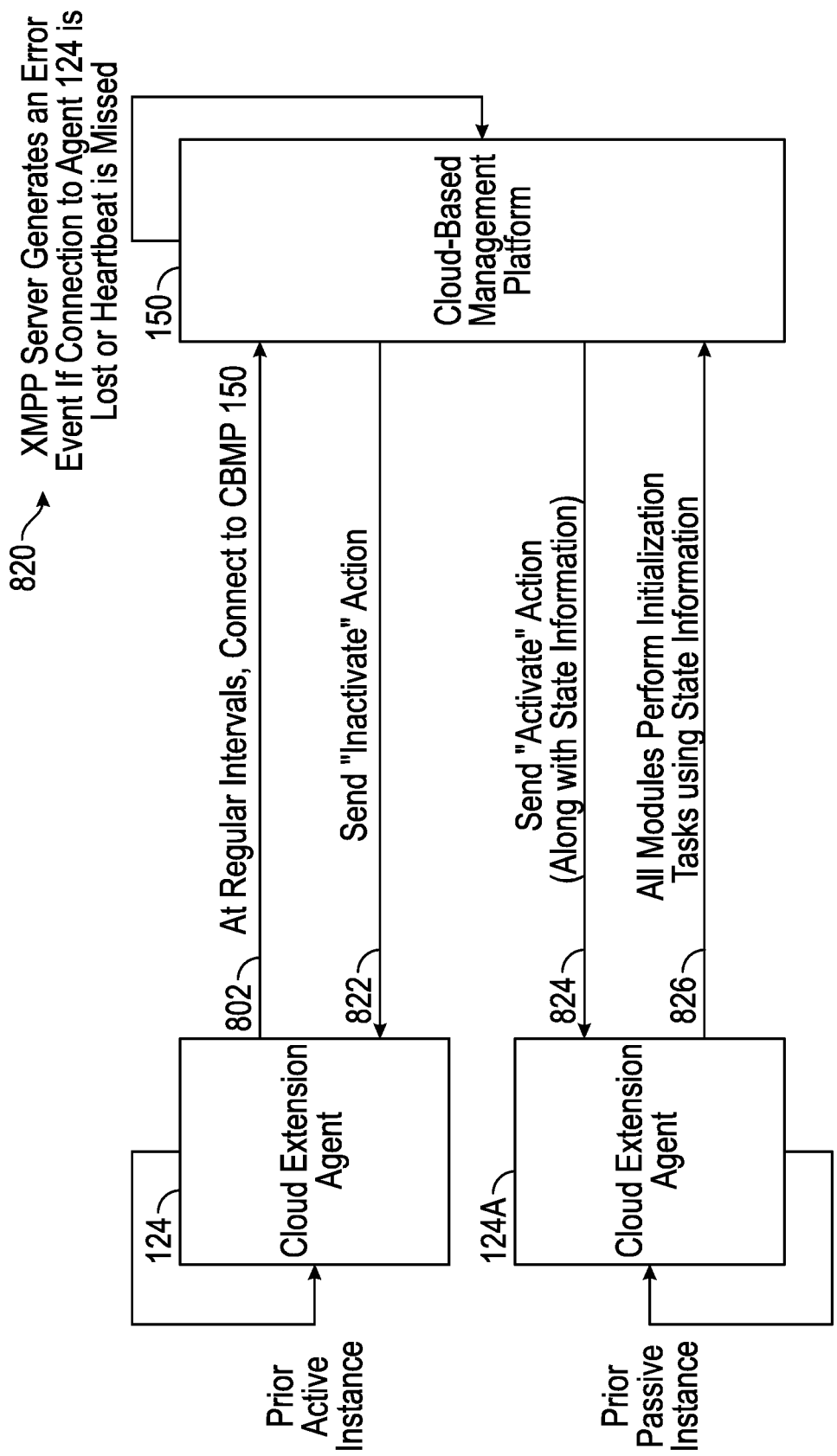
FIG. 14 is a flow chart and system diagram handover of operations between two cloud extension agents for use with certain embodiments of the present invention.

FIG. 14 shows exemplary flow for handing over control from active cloud extension agent 124 to a previously passive cloud extension agent 124A, as described above. At regular intervals cloud extension agent 124 connects to the cloud-based management platform via heartbeat server at step 802. If status information or administrative selection indicates that cloud extension agent 124 is no longer the appropriate active instance of the cloud extension agent, cloud-based management platform 150 can initiate a handover to passive cloud extension agent 124A.

At step 820, either any server interacting with the cloud extension agent, such as the XMPP server or a heartbeat server, can notice that there is a communication error with an active instance of the cloud extension agent 124. The cloud-based management platform 150 can determine from this reported information that cloud extension agent 124 is no longer suitable for management of customer premises. This can arise if cloud extension agent 124 has been incapacitated or breached, crashed, etc.

Upon determining that cloud extension agent 124 is no longer suitable to be the active instance of the cloud extension agent managing customer premises 120, cloud-based management platform sends an inactivate message to cloud extension agent 124, at step 822. This can be via the XMPP server 160. If cloud extension agent 124 is not currently connected, the inactivate message can be queued such that the next time cloud extension agent 124 connects to cloud-based management platform 150. It will receive the message.

At step 824 cloud-based management platform 150 sends an activate message to passive instance 124A. Cloud-based management platform 150 can also send any state information that was previously received from active instance 124. In this manner, at step 824 cloud extension agent 124A receives all the information necessary for handover of cloud extension agent 124's active role. Subsequently, cloud extension agent 124A begins the monitoring process of an active cloud extension agent, managing customer premises 120. At step 826 cloud extension agent 124A performs all initialization tasks necessary to complete the handover and sends updated status information and confirmation to cloud-based management platform 150 to complete the handover. Accordingly, at this point, the roles of cloud extension agent 124, and 124A, have successfully switched.

Examples of Data Formats

The following are examples of the data formats that can be used for communications to or from the cloud extension agent, such as during the various data flows described throughout this specification.

An exemplary list of the core/generic attributes for describing user devices 26 is shown in Table 2.

TABLE 2

| Attribute | Description | Data Type |
|---|---|---|
| Device ID | Unique ID of the Device in the $3^{rd}$ party application | String |
| Is New | Flag that indicates whether the device is new and whether its data is being uploaded for the first time. | Boolean - Yes/No |
| Device Name | Name of the device | String |
| Serial Number (IMEI/ESN) | IMEI or ESN for the device depending on whether the device supports GSM or CDMA | String |
| Email Address | Corporate Email address of the user of the device. Typically this is used to register the device. | String |
| Username | AD Username of the user of the device - Typically this is used to register the device. | String |
| Domain | Domain of the user of the device | String |
| Installed Date Time (GMT) | Activation date/time of the device in the $3^{rd}$ party application. This should be in GMT | Timestamp |
| Last Reported Time (GMT) | Last Sync date/time of the device in the $3^{rd}$ party application. This should be in GMT | Timestamp |
| Platform | Device Platform - One of following values - iOS, Android, Windows Mobile, Windows Phone 7, Symbian, Palm, BlackBerry, Others | Enumeration |
| Source | Name of the $3^{rd}$ party application that is providing the data | String |

An exemplary list of the attributes for describing a device that is being deregistered is shown in Table 3.

TABLE 3

| Attribute | Description | Data Type |
|---|---|---|
| Device ID | Unique ID of the Device in the $3^{rd}$ party application | String |
| Deregistration Date | Date in the $3^{rd}$ party application when the device was deleted/deactivated. This date should be in GMT | Timestamp |
| Deleted By | Account in the $3^{rd}$ party application that deleted/deactivated the Device ID. | String |

An exemplary list of the attributes for hardware, including corporate servers and the hardware on the customer premises for hosting the cloud extension agents is shown in Table 4 and Table 5. Table 4 shows the static or basic data associated with hardware, while Table 5 shows dynamic data associated with the hardware that is likely to change on incremental state changes.

TABLE 4

| Attribute | Description | Data Type |
|---|---|---|
| Device ID | Unique ID of the Device in the $3^{rd}$ party application | String |
| Device Type | Possible device types - Desktop, Laptop, Server, Smartphone, Tablet or Others | Enumeration |
| Manufacturer | Manufacturer of the device | String |
| Model | Model Name of the device | String |
| Model ID | Model ID of the device | String |
| Platform Serial Number | Platform specific serial of the device. For ex: Apple Serial Number, PIN, etc | String |
| UDID | UDID or UUID of the device | String |
| Operating System | Operating System and Major Version of the device. For ex: iOS 4 | String |
| Operating System Version | Full Operating System version including the build number | String |
| Software Platform Version | Software Platform version (specific to BlackBerry) | String |
| Modem Firmware Version | Specific to iOS, Modem Firmware Version | String |
| Total Internal Storage | Total internal memory of the device in GB | Float |
| Total External Storage | Total external (SD card) memory of the device in GB | Float |
| RAM | RAM on the device (in MB) | Integer |
| Screen Width | Screen width of the device | Float |
| Screen Resolution | Screen resolution of the device | String |

TABLE 4-continued

| Attribute | Description | Data Type |
| --- | --- | --- |
| Screen Language | Screen Language of the device | String |
| Timezone | Current timezone offset of the device. Ex: +0530 | String |
| Last Reported Time (GMT) | Last Sync date/time of the device in the 3$^{rd}$ party application. This should be in GMT | Timestamp |

TABLE 5

| Attribute | Description | Data Type |
| --- | --- | --- |
| Device ID | Unique ID of the Device in the 3$^{rd}$ party application | String |
| Available Internal Storage | Free internal memory of the device in GB | Float |
| Available External Storage | Free external memory of the device in GB | Float |
| Total Application Data | Total size of data across all applications on the device | Float |
| Battery Level | Current battery level (in percentage) of the device | Float |
| Battery Condition | Current condition of the device battery | String |
| Last Reported Time (GMT) | Last Sync date/time of the device in the 3$^{rd}$ party application. This should be in GMT | Timestamp |

An exemplary list of the attributes related to security and compliance status of a user device is shown in Table 6. In addition, information related to the particular states of the device related to Exchange ActiveSync or BES attributes.

TABLE 6

| Attribute | Description | Data Type |
| --- | --- | --- |
| Device ID | Unique ID of the Device in the 3$^{rd}$ party application | String |
| Jailbroken or Rooted Device | Applicable to iOS and Android devices. Indicates whether the device is Jailbroken, in case of an iOS device or whether it is Rooted, in case of an Android device | Boolean |
| Device Password Status | Whether the Password is required to use the device and what is the status of the device with regards to Password policy<br>Compliant<br>Not Enabled<br>Not Compliant per all requirements<br>Not Compliant per Profiles<br>Passcode Policy Configured<br>Passcode Policy Not Configured<br>Not Available | Enumeration |
| Minimum Password Length | Minimum length of the password enforced on the device | Integer |
| Password Quality | Quality of the password enforced<br>Numeric<br>Alphabetic<br>Alpha-numeric | Enumeration |
| Maximum Time to Lock | Time in minutes after which the device will automatically lock | Integer |
| Maximum Failed Password Attempts for Wipe | Number of failed password attempts after which the device will automatically wipe | Integer |
| Encryption Status | Encryption Status of the device<br>No Encryption<br>File-level Encryption (iOS only)<br>Block-level Encryption (iOS only)<br>File & Block-level Encryption (iOS only)<br>Partial Encryption<br>Encryption Complete | Enumeration |
| Policy Name | Name of the policy enforced on the device | String |
| Policy ID | A unique identified for the policy on the device | String |
| Policy Version | Currently enforced version of the policy | Integer |
| Last Policy Update Date/Time | Last date/time when any policy update was given to the device. This should be in GMT | Timestamp |
| Policy Compliance Status | Whether the device is in compliance per applied policies. Possible values: In-Compliance, Out-of-Compliance | Enumeration |
| Is Remote Wipe Supported | Whether remote wipe is supported by the device | Boolean |
| Device Wiped | Status of wipe action sent to the device. Possible values: Pending, Complete | Enumeration |
| Last Wipe Applied Date/Time | Date/time when Wipe was applied. In case multiple wipe commands can be sent to the device (like in case of Exchange server), this should be the last date/time for the wipe. This should be in GMT | Timestamp |
| Last Time Message Received by Device | Last time message was received by the device | Timestamp |
| Last Time Message Sent from Device | Last time message was sent from the device | Timestamp |
| Auto-Backup Configured | Whether automatic backup is configured for the device | Boolean |
| Auto-Backup Frequency | Frequency of automatic backup<br>Daily<br>Weekly<br>Monthly<br>Others | Enumeration |
| Last Successful Backup Time | Last time there was a successful backup from the device | Timestamp |
| Auto-Backup Exclusions | Items excluded from automatic backup<br>Messages<br>PIM Data<br>MMC Data | Enumeration |
| Allow User to install applications | Allow the user to install applications | Boolean |
| Last Reported Time (GMT) | Last Sync date/time of the device in the 3$^{rd}$ party application. This should be in GMT | Timestamp |

An exemplary list of the attributes related to identifying policies defined on a device is shown in Table 7.

TABLE 7

| Attribute | Description | Data Type |
| --- | --- | --- |
| Policy Name | Name of the policy | String |
| Is Default | Whether the policy is default for the customer | Boolean |
| Created On | Date on which policy was created | Timestamp |
| Policy Type | Higher level categorization of policies | String |
| Policy Parameter | Name of the policy parameter | String |
| Policy Parameter Value | Value of the policy parameter | String |

An exemplary list of the attributes related to identifying profiles defined on a device is shown in Table 8.

TABLE 8

| Attribute | Description | Data Type |
| --- | --- | --- |
| Device ID | Unique ID of the Device in the 3$^{rd}$ party application | String |
| Profile Name | Name of the profile | String |
| ID | Unique identified of the profile | String |
| Expiry Date Time | Expiry date and time of the profile | Timestamp |

In addition, other formats can be used to send any other information contemplated by the embodiments described herein. For example, information about network status can be recorded and sent, including static traits such as carrier and phone number of a device, as well as dynamic information, such as the current location of the device.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
providing, by a remote network management platform, a first cloud extension agent that facilitates internet-based management of a first set of local computing resources of a first network, wherein the first set of local computing resources comprises mobile devices associated with the first network, and wherein the first cloud extension agent is to run locally on the first network and initiate a first connection to the remote network management platform through a firewall of the first network without reconfiguration;
establishing the first connection to the first cloud extension agent;
providing a second cloud extension agent that facilitates internet-based management of a second set of local computing resources of a second network, wherein the second set of local computing resources comprises servers associated with the second network, and wherein the second cloud extension agent is to run locally on the second network and initiate a second connection to the remote network management platform through a firewall of the second network without reconfiguration;
establishing the second connection to the second cloud extension agent;
providing a first set of instructions to the first cloud extension agent via the first connection and a second set of instructions to the second cloud extension agent via the second connection;
receiving, from the first cloud extension agent via the first connection, a first snapshot of corresponding statuses of the first set of local computing resources;
receiving, from the second cloud extension agent via the second connection, a second snapshot of corresponding statuses of the second set of local computing resources;
receiving, from at least one of the first cloud extension agent via the first connection or the second cloud extension agent via the second connection, only incremental data comprising changes in at least one of the corresponding statuses of the first set of local computing resources captured in the first snapshot or the corresponding statuses of the second set of local computing resources captured in the second snapshot.

2. The method of claim 1, wherein the first set of instructions comprises one or more actions to be performed by the first cloud extension agent on the first set of local computing resources and the second set of instructions comprises one or more actions to be performed by the second cloud extension agent on the second set of local computing resources.

3. The method of claim 1, wherein the first set of local computing resources corresponds to a first region of the first network and wherein the second set of local computing resources corresponds to a second region of the second network.

4. The method of claim 3, wherein the first region corresponds to a first geographic location and the second region corresponds to a second geographic location.

5. The method of claim 1, wherein providing the first cloud extension agent and the second cloud extension agent facilitates load balancing of the first network and the second network.

6. The method of claim 1, wherein the first set of instructions is different than the second set of instructions.

7. The method of claim 1, wherein at least one of the first set of instructions or the second set of instructions corresponds to a software upgrade.

8. The method of claim 1, wherein at least one of the first set of instructions or the second set of instructions corresponds to a configuration change.

9. The method of claim 1, wherein at least one of the first set of instructions or the second set of instructions corresponds to a policy change.

10. A system comprising:
a memory; and
a hardware resource operatively coupled to the memory, the hardware resource to:
provide, by a remote network management platform, a first cloud extension agent that facilitates internet-based management of a first set of local computing resources of a first network, wherein the first set of local computing resources comprises mobile devices associated with the first network, and wherein the first cloud extension agent is to run locally on the first network and initiate a first connection to the remote network management platform through a firewall of the first network without reconfiguration;
establish the first connection to the first cloud extension agent;
provide a second cloud extension agent that facilitates internet-based management of a second set of local computing resources of a second network, wherein the second set of local computing resources comprises servers associated with the second network, and wherein the second cloud extension agent is to run locally on the second network and initiate a second connection to the remote network management platform through a firewall of the second network without reconfiguration;
establish the second connection to the second cloud extension agent;
provide a first set of instructions to the first cloud extension agent via the first connection and a second set of instructions to the second cloud extension agent via the second connection;
receive, from the first cloud extension agent via the first connection, a first snapshot of corresponding statuses of the first set of local computing resources;

receive, from the second cloud extension agent via the second connection, a second snapshot of corresponding statuses of the second set of local computing resources; and receive, from at least one of the first cloud extension agent via the first connection or the second cloud extension agent via the second connection, only incremental data comprising changes in at least one of the corresponding statuses of the first set of local computing resources captured in the first snapshot or the corresponding statuses of the second set of local computing resources captured in the second snapshot.

11. The system of claim 10 wherein the first set of instructions comprises one or more actions to be performed by the first cloud extension agent on the first set of local computing resources and the second set of instructions comprises one or more actions to be performed by the second cloud extension agent on the second set of local computing resources.

12. The system of claim 10, wherein the first set of local computing resources corresponds to a first region of the first network and wherein the second set of local computing resources corresponds to a second region of the second network.

13. The system of claim 12, wherein the first region corresponds to a first geographic location and the second region corresponds to a second geographic location.

14. The system of claim 10, wherein providing the first cloud extension agent and the second cloud extension agent facilitates load balancing of the first network and the second network.

15. The system of claim 10, wherein the first set of instructions is different than the second set of instructions.

16. The system of claim 10, wherein at least one of the first set of instructions or the second set of instructions corresponds to a software upgrade.

17. The system of claim 10, wherein at least one of the first set of instructions or the second set of instructions corresponds to a configuration change.

18. The system of claim 10, wherein at least one of the first set of instructions or the second set of instructions corresponds to a policy change.

19. A non-transitory computer readable medium, having instructions stored thereon which, when executed by a hardware resource, cause the hardware resource to:

provide, by a remote network management platform, a first cloud extension agent that facilitates internet-based management of a first set of local computing resources of a first network, wherein the first set of local computing resources comprises mobile devices associated with the first network, and wherein the first cloud extension agent is to run locally on the first network and initiate a first connection to the remote network management platform through a firewall of the first network without reconfiguration;

establish the first connection to the first cloud extension agent;

provide a second cloud extension agent that facilitates internet-based management of a second set of local computing resources of a second network, wherein the second set of local computing resources comprises servers associated with the second network, and wherein the second cloud extension agent is to run locally on the second network and initiate a second connection to the remote network management platform through the firewall of the second network without reconfiguration;

establish the second connection to the second cloud extension agent;

provide a first set of instructions to the first cloud extension agent via the first connection and a second set of instructions to the second cloud extension agent via the second connection;

receive, from the first cloud extension agent via the first connection, a first snapshot of corresponding statuses of the first set of local computing resources;

receive, from the second cloud extension agent via the second connection, a second snapshot of corresponding statuses of the second set of local computing resources; and receive, from at least one of the first cloud extension agent via the first connection or the second cloud extension agent via the second connection, only incremental data comprising changes in at least one of the corresponding statuses of the first set of local computing resources captured in the first snapshot or the corresponding statuses of the second set of local computing resources captured in the second snapshot.

20. The non-transitory computer readable medium of claim 19, wherein the first set of instructions comprises one or more actions to be performed by the first cloud extension agent on the first set of local computing resources and the second set of instructions comprises one or more actions to be performed by the second cloud extension agent on the second set of local computing resources.

21. The non-transitory computer readable medium of claim 19, wherein the first set of local computing resources corresponds to a first region of the first network and wherein the second set of local computing resources corresponds to a second region of the second network.

22. The non-transitory computer readable medium of claim 21, wherein the first region corresponds to a first geographic location and the second region corresponds to a second geographic location.

23. The non-transitory computer readable medium of claim 19, wherein providing the first cloud extension agent and the second cloud extension agent facilitates load balancing of the first network and the second network.

24. The non-transitory computer readable medium of claim 19, wherein the first set of instructions is different than the second set of instructions.

25. The non-transitory computer readable medium of claim 19, wherein at least one of the first set of instructions or the second set of instructions corresponds to a software upgrade.

26. The non-transitory computer readable medium of claim 19, wherein at least one of the first set of instructions or the second set of instructions corresponds to a configuration change.

27. The non-transitory computer readable medium of claim 19, wherein at least one of the first set of instructions or the second set of instructions corresponds to a policy change.

* * * * *